United States Patent
Wei et al.

(10) Patent No.: US 12,463,729 B2
(45) Date of Patent: Nov. 4, 2025

(54) SYSTEM AND METHOD FOR WAVELENGTH CONTROL IN FREQUENCY REFERENCED PASSIVE OPTICAL NETWORK

(71) Applicant: HUAWEI TECHNOLOGIES CO., LTD., Shenzhen (CN)

(72) Inventors: Jinlong Wei, Shenzhen (CN); Zhicheng Ye, Dongguan (CN); Zhixin Liu, London (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 257 days.

(21) Appl. No.: 18/460,296

(22) Filed: Sep. 1, 2023

(65) Prior Publication Data

US 2023/0412278 A1   Dec. 21, 2023

Related U.S. Application Data

(63) Continuation of application No. PCT/EP2021/055988, filed on Mar. 10, 2021.

(51) Int. Cl.
*H04B 10/572* (2013.01)
*H04B 10/27* (2013.01)
(Continued)

(52) U.S. Cl.
CPC .......... *H04B 10/572* (2013.01); *H04B 10/27* (2013.01); *H04B 10/503* (2013.01); *H04B 10/516* (2013.01)

(58) Field of Classification Search
CPC .... H04B 10/572; H04B 10/27; H04B 10/503; H04B 10/516
See application file for complete search history.

(56) References Cited

U.S. PATENT DOCUMENTS

2008/0085118 A1   4/2008   Effenberger
2008/0267630 A1   10/2008  Qian et al.
(Continued)

FOREIGN PATENT DOCUMENTS

EP   2573961 A1   3/2013
EP   2693664 A1   2/2014

OTHER PUBLICATIONS

Straullu et al., "Optimization of Reflective FDMA-PON Architecture to Achieve 32 GB/s Per Upstream Wavelength Over 31 dB ODN Loss," Journal of Lightwave Technology, vol. 33, No. 2, pp. 474-480 (Jan. 15, 2015).

(Continued)

*Primary Examiner* — Quan Zhen Wang
(74) *Attorney, Agent, or Firm* — Leydig, Voit & Mayer, Ltd.

(57) ABSTRACT

A system is provided for wavelength control in a passive optical network (PON) with point to multi-point (P2MP) topology. The system comprises a central node and a plurality of end nodes. The system comprises a central node transceiver configured for broadcasting to end nodes a reference signal carrying a management information, wherein the management information indicates a target frequency assigned to each end node, and an end node transceiver in each end node. The end node transceiver in each end node is configured for determining the target frequency by extracting the management information from the reference signal, generating a beating frequency by beating the reference signal with an uplink laser signal, and controlling a wavelength of the uplink laser signal to lock to the target frequency based on the beating frequency.

24 Claims, 8 Drawing Sheets

(51) Int. Cl.
*H04B 10/50* (2013.01)
*H04B 10/516* (2013.01)

(56) References Cited

U.S. PATENT DOCUMENTS

| | | |
|---|---|---|
| 2009/0074019 A1 | 3/2009 | Wong et al. |
| 2012/0251122 A1* | 10/2012 | Grobe ............... H04J 14/02764 |
| | | 398/79 |
| 2014/0247840 A1* | 9/2014 | Eiselt ................. H04J 14/0258 |
| | | 370/535 |
| 2016/0087749 A1* | 3/2016 | Lawin ................. H04J 14/0246 |
| | | 398/49 |

OTHER PUBLICATIONS

Talli et al., "Advantageous Effects of Gain Saturation in Semiconductor Optical Amplifier-Based Integrated Reflective Modulators," Journal of Lightwave Technology, vol. 32, No. 3, pp. 392-401 (Feb. 1, 2014).

\* cited by examiner

| Central Node Reference Tone 402 | Uplink Signal Spectrum 404 | End Node (EN) Frequency Locking and Data Modulation 406 |
|---|---|---|
| 302A | 326 | Each ONU locks to an unique tone : Subcarrier modulation (SCM) 408 |
| 302A | 410 | A few ONUs lock to an identical reference tone; moderate low SCM + CDM 412 |
| 302B | 328 | All ONUs lock to the same reference tone; SCM 414 |
| 302B | 416 | A few ONUs lock to a frequency with same space to reference moderate tone; SCM + CDM 418 |
| 302B | 420 | Each ONU locks to a frequency with an unique space to reference low high tone; SCM 422 |

FIG. 4

SYSTEM AND METHOD FOR WAVELENGTH CONTROL IN FREQUENCY REFERENCED PASSIVE OPTICAL NETWORK

CROSS-REFERENCE TO RELATED APPLICATIONS

This application is a continuation of International Application No. PCT/EP2021/055988, filed on Mar. 10, 2021, the disclosure of which is hereby incorporated by reference in its entirety.

FIELD

The present disclosure relates generally to the field of optical communication and more specifically, to a system and a method for wavelength control in a frequency referenced passive optical network.

BACKGROUND

In optical communication, modulated light is transmitted to/from different users over a shared optical fiber infrastructure, such as point to multi-point (P2MP) topology based communication network. Such communication networks require multiplexing schedules to avoid a collision of signals from different users. Generally, optical communication are based on a passive optical network (PON) technology. Moreover, in a downstream link transmission (or implementation) of the conventional passive optical network, data is broadcasted to multiple users, where each user selects its own data at an assigned time slot. Further, in an upstream link transmission, the conventional passive optical networks apply time-division multiplexing (TDM) for data multiplexing, where each user sends its data at assigned time slots so as to avoid collision with other users in the shared optical fiber infrastructure. Typically, the upstream transmission for the time-division multiplexing requires a burst optical transmitter at the optical network users (ONU) and burst mode receivers at optical line terminals (OLT) or central offices (OC). Further, when a digital signal processing (DSP) is introduced, the upstream transmission for the time-division multiplexing also requires burst mode analog-to-digital converters (ADC). However, the aforesaid burst mode components are expensive and are technically challenging, especially for the conventional passive optical network of a high data rate (e.g., 50 gigabit/s and beyond). Further, all the optical network users have to use a high bandwidth transceiver to match the overall bit rate. However, the per-user capacity of time-division multiplexing based passive optical network is inversely proportional to the number of optical network users, which makes such passive optical network difficult to evolve to the high data rate (i.e., higher speed data). Further, the time-division multiplexing based passive optical network have a large latency as well as a burst latency. Therefore, it is difficult to expand services of the time-division multiplexing based passive optical network, such as to support emerging fifth-generation (5G) applications (e.g., autonomous driving, an augmented reality (AR), a tactile internet, and the like). Further, the burst latency due to a burst nature of time-division multiplexing based passive optical network also introduces a jitter (i.e., time variation), which cannot fulfill a required quality of service (QoS) of many applications.

Currently, certain attempts have been made to improve the architecture of the passive optical networks, for example, by using frequency division multiplexing (FDM) and code division multiplexing (CDM). However, the main technical problem with such attempts is interference between data of different optical network users in the uplink transmission as multiple user's data are transmitted, detected, and processed simultaneously in a continuous manner. For example, a frequency division multiple access (FDMA) based passive optical network architecture may be used to support the upstream transmission in the point to multi-point topology. In such architecture, an optical line terminator, which can be referred to as a central office, may provide a single wavelength seed light to all of the optical network users through a power splitter located in the optical distribution network. Each optical network user amplifies, modulates and reflects the seed light into the uplink by means of an integrated reflective emiconductor (SOA) and a Mach-Zehnder modulator (MZM). Each optical network user also applies subcarrier modulation in the radio frequency domain and upshifts its data to an intermediate frequency assigned by the optical line terminator. At that, the optical line terminator uses a single self-coherent receiver (Rx) to detect all the optical network users' data which is a cost-effective solution. However, each optical network user device in this case has a complicated structure and needs careful optimization to achieve acceptable performance, including the frequency allocation optimization, the SOA gain optimization and the MZM modulation efficiency optimization. A critical drawback of such system is that if there is an uplink reflection in the SOAs of the optical network user devices, it would cause SOA gain ripples and, in an extreme case, the reflection signal can be amplified so as to destroy the data signal.

Also, modulated downstream signals may be used in the wavelength division multiplexing (WDM) passive optical networks to injection-lock vertical-cavity surface-emitting lasers (VCSELs) enabling its operation as stable, uncooled, and directly-modulated upstream transmitters. As a result, the VCSEL output signal has a wavelength identical to that of the downstream injecting signal, which facilitates central control of each optical network user wavelength. However, in this case, there is a very limited injection power ratio since the VCSEL is modulated, which means the passive optical network cannot support a high-loss optical distribution network. Also, such WDM-based infrastructure is not compatible with a power split optical distribution network to support traditional passive optical networks.

In general, conventional solutions for FDM passive optical networks that involve wavelength/frequency control are characterized by the following drawbacks: they do not provide for high accuracy (e.g., less than 100 MegaHertz (MHz) deviation), they do not support either an FDM passive optical network with a small channel space or a power split optical distribution network, they are highly vulnerable to the uplink reflection, and they have a poor receiver optical power sensitivity in an uplink transmission. Thus, there exists a technical problem to design a solution to address the frequency/wavelength control issue of the frequency division multiplexing system for the point to multi-point communications. Currently, there is no universal solution available for adequate wavelength control in frequency division multiplexing based systems.

Therefore, in light of the foregoing discussion, there exists a need to overcome the aforementioned drawbacks associated with the conventional approaches to frequency referenced passive optical network design for point to multi-point communications.

SUMMARY

The present disclosure provides a system and a method for wavelength control in a frequency referenced passive optical network. The present disclosure provides a solution to the existing problem of the frequency/wavelength control in a frequency division multiplexing system for point to multi-point communications. For example, aspects of the present disclosure provide a solution that overcomes at least partially the problems encountered in the prior art and provides an improved system and method for wavelength control in a frequency referenced passive optical network, compatible to a power-split optical distribution network (ODN) which has tolerance to uplink reflection, and has high power sensitivity.

In one aspect, the present disclosure provides a system that is used for wavelength control in a passive optical network (PON) with point to multi-point (P2MP) topology comprises the central node and the end nodes. The system comprises a central node transceiver configured for broadcasting to end nodes a reference signal carrying a management information. The management information indicates a target frequency assigned to each end node. An end node transceiver in each end node is configured for determining the target frequency by extracting the management information from the reference signal, generating a beating frequency by beating the reference signal with an uplink laser signal, and controlling a wavelength of the uplink laser signal to lock to the target frequency based on the beating frequency.

The present disclosure provides an improved system with a continuous mode operation for wavelength control in a passive optical network (PON) with point to multi-point (P2MP) topology. The system provides a coherent central node transceiver with an improved accuracy, flexibility, and a low-cost potential, as compared to a conventional transceiver. The system further provides an improved architecture of each end node, so as to extract the management information and generate the beating frequency with an improved optical power sensitivity along with tolerance to an uplink reflection without affecting the system performance. Beneficially, as compared to the conventional systems, a wavelength of the uplink laser signal is controlled in each end node transceiver to lock to the target frequency based on the beating frequency, which avoids collision of signals from each end node transceiver. As a result, the system is particularly suitable for low-cost point to multi-point communication, and the system is compatible to already existing power-split optical distribution networks (ODN). Moreover, the system uses a non-time division multiplexing (TDM) multiplexing architecture, therefore the system could become standard-relevant to non-TDM PON systems for point to multi-point communication.

In an implementation, the central node transceiver comprises a downlink laser source for generating the reference signal, a polarization scrambler (PS) for varying a state of polarization (SOP) of the reference signal, and a modulator for modulating the reference signal by a data of the management information.

The central node transceiver of the central node is capable to generate the reference signal with different frequencies (tones), which carry the data of the management information, so as to realize the frequency allocation and alignment in the passive optical network (PON) over the point to multi-point (P2MP) topology (or communication network). Beneficially as compared to the conventional transceiver, the polarization scrambler (PS) of the transceiver is used for varying the state of polarization of the reference signal, thus the system does not need any polarization maintaining fibers.

In a further implementation, the management information data is a low-speed data.

Due to the low-speed data of the management information, the reception sensitivity of each end node transceiver which detects and recovers the management data is high.

In a further implementation, the downlink laser source is configured for generating the reference signal with a single reference frequency. The management information indicates the target frequency assigned to each end node by indicating a target frequency band on a pre-determined distance to the single reference frequency for each end node.

In other words, according to this implementation each end node locks to a target frequency on a pre-determined distance to the single reference frequency or tone. In this case each end node transceiver can have a low bandwidth, while the frequency lock loop unit requires a high bandwidth.

In another implementation, the downlink laser source is configured for generating the reference signal with a frequency comb comprising a plurality of reference tones, and the management information indicates the target frequency assigned to each end node by indicating a reference tone of the frequency comb assigned to each end node.

In this implementation it is advantageous to use low bandwidth components in each end node transceiver and the frequency lock loop unit.

In a further implementation, a number of the reference tones of the frequency comb is less than a number of the end nodes, and the management information indicates a reference tone of the frequency comb assigned to each end node and a target frequency band on a pre-determined distance to the reference tone for each end node.

In this implementation several end nodes lock to the same reference tone, therefore a low bandwidth is required for each end node transceiver, while the frequency lock loop unit can have a moderate bandwidth.

In a further implementation, each end node transceiver is configured for applying a subcarrier modulation (SCM) or a code-division multiplexing (CDM) to the uplink laser signal transmitted in the target frequency band assigned to several end nodes.

By virtue of applying the subcarrier modulation or the code-division multiplexing to the uplink laser signal, several end nodes are locked to the same frequency band and a cost-effective system is obtained with improved optical power sensitivity.

In a further implementation, a number of the reference tones of the frequency comb is equal or larger than a number of the end nodes, and each end node transceiver is configured for applying a baseband modulation or a subcarrier modulation (SCM) to the uplink laser signal transmitted at the target frequency.

As the number of the reference tones of the frequency comb is equal to or larger than a number of the end nodes, each end node transceiver and the frequency lock loop unit can have a low bandwidth. Moreover, in this case the system can be easily scaled to a greater number of end nodes by simply increasing the reference tone count (or a baud rate) of the end nodes modulating signal.

In a further implementation, each end node transceiver is further configured for splitting the reference signal into two parts, wherein the management information is extracted from a first part of the reference signal, and the beating frequency is generated by beating a second part of the reference signal with the uplink laser signal.

This implementation facilitates locking to the target frequency of each end node with high accuracy.

In a further implementation, each end node transceiver comprises a photodiode (PD) for extracting the management information, a control unit (CU) for determining the target frequency and generating uplink laser tuning direction indications. Each end node transceiver further comprises an uplink laser source for generating an uplink laser signal, a frequency lock loop (FLL) unit for generating the beating frequency. Each end node transceiver further comprises and a thermoelectrical cooler (TEC) and a current control unit for controlling the wavelength of the uplink laser signal based on the uplink laser tuning direction indications, and a digital signal processing (DSP) unit for generating an uplink user data to modulate the uplink laser signal directly or externally.

As the proposed system relies only on a frequency lock loop unit in each end node, which can be easily integrated with the end node transceiver at chip-level, thus the system is easy to implement as compared to a conventional system. Moreover, the frequency lock loop unit of the end node transceivers has a high power sensitivity, a low cost, support a high split ratio with an accurate uplink wavelength control, and in certain scenarios the frequency lock loop unit can be based on low bandwidth components.

In an implementation, each end node transceiver comprises a splitter for splitting the reference signal into two parts, a photodiode (PD) for extracting the management information, a control unit (CU) for determining the target frequency and generating uplink laser tuning direction indications. Each end node transceiver further comprises an uplink laser source for generating an uplink laser signal, a frequency lock loop (FLL) unit for generating the beating frequency. Each end node transceiver further comprises a thermoelectrical cooler (TEC) and a current control unit for controlling the wavelength of the uplink laser signal based on the uplink laser tuning direction indications, and a digital signal processing (DSP) unit for generating an uplink user data to modulate the uplink laser signal directly or externally.

In a further implementation, the polarization scrambler (PS) has a frequency of the state of polarization (SOP) variation enabling the frequency lock loop (FLL) unit in each end node to stably lock to the target frequency.

In this implementation the frequency lock loop unit is advantageously able to detect the beating frequency signal power in all cases and avoid the issue of polarization orthogonality between the two input reference signals.

In a further implementation, the FLL unit comprises a photodiode (PD) a transimpedance amplifier (TIA) a phase frequency detector (PFD) and a proportion and integration (PI) control feedback block.

In another aspects, the present disclosure presents a method of wavelength control in a passive optical network (PON) with point to multi-point (P2MP) topology comprising a central node and end nodes. The method comprises broadcasting from the central node to end nodes a reference signal carrying a management information, wherein the management information indicates a target frequency assigned to each end node. The method further comprises determining the target frequency in each end node by extracting the management information from the reference signal. The method further comprises generating a beating frequency in each end node by beating the reference signal with an uplink laser signal. The method further comprises controlling a wavelength of the uplink laser signal in each end node to lock to the target frequency based on the beating frequency.

The method achieves all the technical effects of the system of the present disclosure.

It is to be appreciated that all the aforementioned implementations can be combined. It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 4 is an illustration that depicts various frequency scheduling and data modulation schemes, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
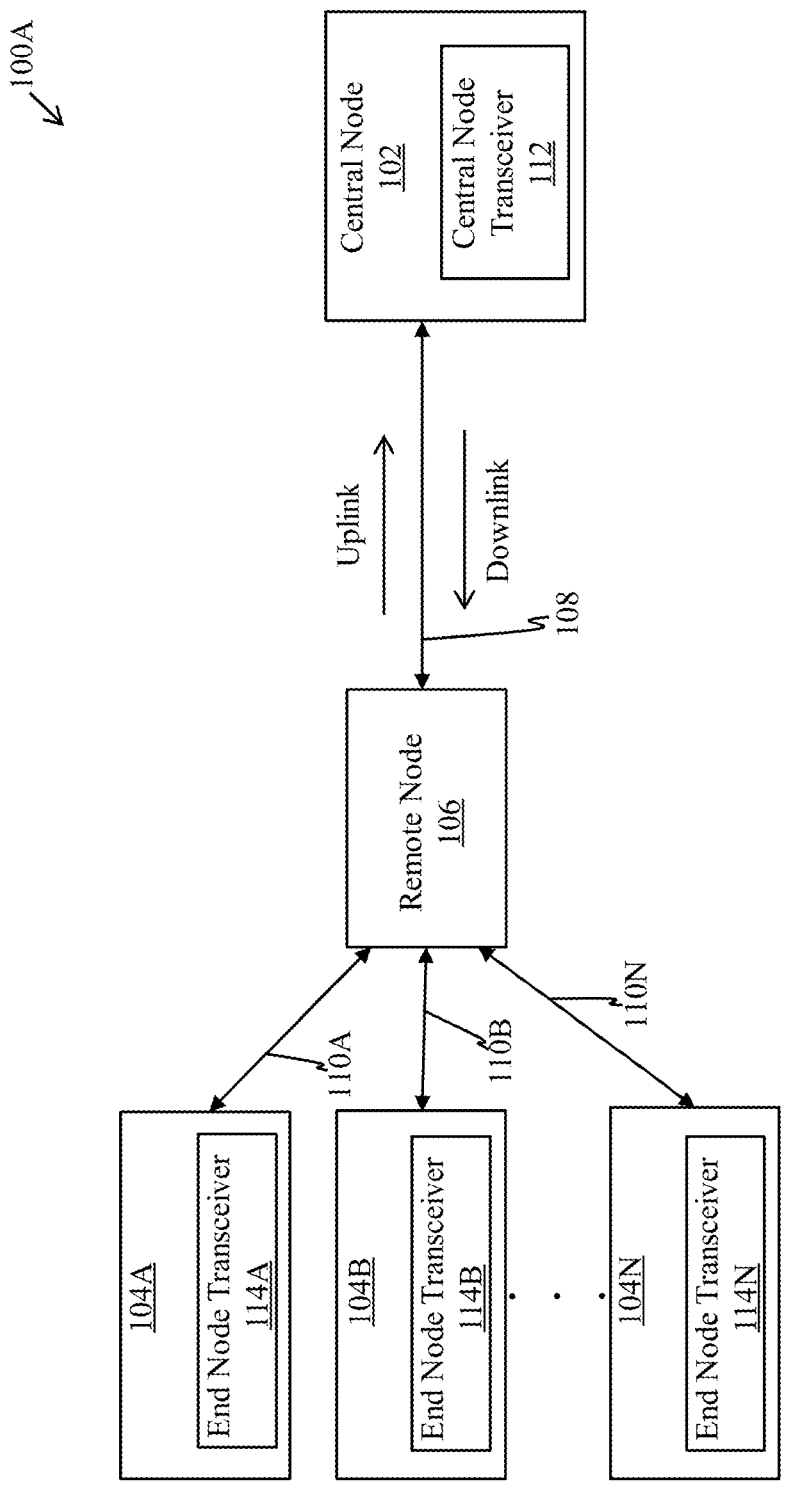
FIG. 1A is a system for wavelength control in a passive optical network (PON) with point to multi-point (P2MP) topology, in accordance with an embodiment of the present disclosure.

FIG. 1A is a system for wavelength control in a passive optical network (PON) with point to multi-point (P2MP) topology, in accordance with an embodiment of the present disclosure. With reference to FIG. 1A there is shown a system 100A that comprises a central node 102, end nodes 104A to 104N, a remote node 106, a central node optical link 108, and end node optical links 110A to 110N. The central node 102 further includes a central node transceiver 112, and each end node 104A to 104N further includes end node transceivers 114A to 114N.

In one aspect, the present disclosure provides a system 100A for wavelength control in a passive optical network, PON, with point to multi-point, P2MP, topology comprising a central node 102 and end nodes 104A to 104N, the system 100A comprising:

a central node transceiver 112 configured for broadcasting to end nodes 104A to 104N a reference signal carrying a management information, wherein the management information indicates a target frequency assigned to each end node 104A to 104N, and an end node transceiver 114A to 114N in each end node 104A to 104N configured for determining the target frequency by extracting the management information from the reference signal, generating a beating frequency by beating the reference signal with an uplink laser signal, and controlling a wavelength of the uplink laser signal to lock to the target frequency based on the beating frequency.

The system 100A is used for wavelength control in a passive optical network (PON) with a point to multi-point (P2MP) topology that comprises a central node 102 and end nodes 104A to 104N. The passive optical network corresponds to a shared optical fiber (or a fiber-optic) network utilizing a point to multi-point (P2MP) topology. The point to multi-point (P2MP) topology (or communication) is based on a power-split network where a downlink signal, such as a reference signal (or an optical frequency, wavelength) is broadcasted from the central node 102 to each of the end node 104A to 104N. The system 100A is also compatible with the power-split network (or power splitter) based on point to multipoint (P2MP) fiber infrastructure and based on a continuous mode (not burst mode as in conventional systems) operation with low latency and a low cost.

The central node 102 is a starting point for the passive optical network (PON). The central node 102 include a suitable logic, circuitry, interfaces and/or code that is configured to transmit information in the form of an optical signal (or to provide a reference optical signal), such as the reference signal (or wavelengths) to each end node 104A to 104N through the remote node 106 and the central node optical link 108. In an example, the central node 102 is also configured to coordinate the multiplexing between the end nodes 104A to 104N. In an example, the central node 102 has two float transmission directions, such as an upstream transmission (e.g., to receive data) and a downstream transmission (e.g., transmit data to the end nodes 104A to 104N). The central node 102 may also be referred to as central offices (OC), optical line terminals (OLT), optical line termination (OLT), and the like.

The end nodes 104A to 104N include suitable logic, circuitry, interfaces and/or code that is configured to receive the optical signal via the end node optical links 110A to 110N and the remote node 106. Furthermore, each end node 104A to 104N is also configured to send, aggregate, and process different types of data coming from different users and send for upstream transmission to the central node 102. In an example, each end node 104A to 104N may also be referred to as optical network terminals, optical network units, and the like.

The remote node 106 include a suitable logic, circuitry, interfaces and/or code that is configured to be used in the passive optical network (PON) with a point to multi-point (P2MP) topology. The remote node 106 enables communication between the central node 102 and each of the end node 104A to 104N.

Each of the central node optical link 108 and each of the end node optical links 110A to 110N is a bidirectional communication link that comprises a double end-to-end optical circuit, which provides a data connection medium between two points. Examples of the central node optical link 108 and the end node optical links 110A to 110N include, but are not limited to, an optical fiber (such as multimode optical fiber, a single-mode optical fiber, or a plastic optical fiber), or an active optical cable (AOC), or a full-duplex optical link.

The central node transceiver 112, and each of the end node transceiver 114A to 114N is an optical transceiver, which includes suitable logic, circuitry, interfaces and/or code that is configured to transmit information in form of an optical signal through optical links, such as the central node optical link 108, and the end node optical links 110A to 110N. Further, each of the central node transceiver 112, and the end node transceiver 114A to 114N is configured to receive information in the form of an optical signal through optical links. The central node transceiver 112 and the end node transceiver 114A to 114N may also be referred to as an optical module. Examples of the central node transceiver 112 and the end node transceivers 114A to 114N include, but are not limited to, a transceiver, an optical transceiver, or a fiber optic transceiver.

In accordance with an embodiment, the central node transceiver 112 comprises a downlink laser source for generating a reference signal, a polarization scrambler (PS) for varying a state of polarization (SOP) of the reference signal, and a modulator for modulating the reference signal by a data of management information. In other words, the central node transceiver 112 of the central node 102 includes the downlink laser source (e.g., a single wavelength continuous wave (CW) laser, or a comb laser), the polarization scrambler (e.g., an integrated scrambler or a discrete scrambler), and the modulator (e.g., an external modulator with logical circuits). The downlink laser source of the central node transceiver 112 is configured to generate the reference signal, such as a reference frequency tone, an optical reference carrier(s) signal, reference optical frequencies (wavelengths), and the like. In an example, the reference signal received from the downlink laser source is passed through a semiconductor optical amplifier (SOA), where the semiconductor optical amplifier is configured to process and amplify the reference signal. Thereafter, the reference signal is passed through the polarization scrambler (PS), where the state of polarization (SOP) of the reference signal is varied by the polarization scrambler of the central node transceiver 112. In an example, the polarization scrambler is based on a electro-optical materials, and the state of polarization corresponds to different polarization states, such as linear polarization state, circular polarization state, and elliptical polarization state. Therefore, the polarization scrambler of the central node transceiver 112 is used to mitigate polarization related impairments of the reference signal. The reference signal is further modulated by the data of the management information (e.g., a modulating signal), where modulation is performed using a modulator of the central node transceiver 112. Therefore, the central node transceiver 112 of the central node 102 is capable to generate the reference signal with different frequencies (tones), which carry the data of the management information. Moreover, the central node transceiver 112 of the central node 102 broadcasts the reference signal along with the data of the management information to each end node 104A to 104N. Thus, the central node transceiver 112 realizes the frequency allocation and alignment in the passive optical network (PON) over the point to multi-point (P2MP) topology (or communication network).

In accordance with an embodiment, the management information is a low-speed data. In other words, the management information is the low-speed data, such as with a speed of one kilobit/see (Kb/s), which is used by the central node transceiver 112 to modulate the reference signal. Therefore, due to low-speed management information, a reception sensitivity of each end node transceiver 112 is improved.

In operation, the system 100A is used for wavelength control in a passive optical network (PON) with point to multi-point (P2MP) topology comprising the central node 102 and the end nodes 104A to 104N. The central node transceiver 112 is configured for broadcasting to end nodes 104A to 104N, the reference signal carrying the management information. The management information indicates a target frequency assigned to each end node 104A to 104N. The system 100A is used for communication from one point to multi-point in the passive optical network, such as from the central node 102 to end nodes 104A to 104N. The system 100A is used to facilitate the provision of the reference signal (or a downlink signal) from the central node 102 to the each end node 104A to 104N. The central node transceiver 112 is a coherent transceiver, which is configured to broadcast the reference signal as well as the management information to the each end node 104A to 104N. In other words, the central node 102 centrally provides reference frequencies, such as the reference signal modulated by low-speed data, such as the management information to each end node 104A to 104N. In an example, the reference signal and the management information are collectively known as a downlink signal. Moreover, the management information is used to indicate the target frequency assigned to each end node 104A to 104N in the system 100A. Further, the system 100A applies a single coherent receiver, such as the central node transceiver 112, which is used to detect all the end node uplink data so as to address the wavelength (or frequency) control issue with great accuracy, flexibility, and at a low-cost. Moreover, the system 100A is compatible to existing power-split optical distribution networks (ODN), tolerant to uplink reflection, and has high power sensitivity. The proposed system 100A is particularly suitable for low-cost point to multi-point systems based on self-coherent receivers, such as the central node transceiver 112.

In accordance with an embodiment, each end node transceiver 114A to 114N comprises a photodiode (PD) for extracting the management information, a control unit (CU) for determining the target frequency, and generating uplink laser tuning direction indications. Each end node transceiver 114A to 114N further comprises an uplink laser source for generating an uplink laser signal, a frequency lock loop (FLL) unit for generating the beating frequency. In other words, the reference signal and the management information (or the downlink signals) as broadcasted by the central node 102 are received by the photodiode of each end node transceiver 114A to 114N. The photodiode of the corresponding end nodes transceivers 114A to 114N, is configured to extract the management information. In other words, a small portion of the downlink signals is detected by the photodiode of the end node transceiver 114A so as to recover the broadcast management information. Optionally, the output of the photodiode is further processed through a clock and data recovery circuit (CDR) of the end node transceiver 114A so as to extract timing information from the data of the management information. Thereafter, the control unit (e.g., a micro control unit (MCU)) of each of the end node transceivers 114A to 114N, is used to process the management information and also to extract the target frequency of the corresponding end node transceiver 114A, and generate the uplink laser tuning direction indications. Moreover, the uplink laser source of each end node transceiver 114A to 114N is used by each end node 104A to 104N to generate the uplink laser signal for further communication with the central node transceiver 112 of the central node 102. For example, the uplink laser source of the end node transceiver 114A is used by the end node 104A so as to generate the uplink laser signal for further communication with the central node transceiver 112 of the central node 102. Optionally, the uplink laser source can be coupled to the frequency lock loop (FLL) unit, which is further coupled to the control unit so as to reduce the overall cost. In an example, the control unit of the end node transceiver 114A manages the uplink laser tuning direction indications to enable the laser control uplink of the uplink laser source for a frequency scan to identify the target (or reference) frequency.

The frequency lock loop unit of each end node transceiver 114A to 114N is further used to detect the reference signal as broadcasted by the central node 102 and generate the beating frequency from the received reference signal. In an example, the frequency lock loop unit is proposed in each end node transceiver 114A to 114N, so as to enable its uplink laser signal (or laser frequency) locked to the assigned target frequency (or reference). Moreover, the control unit (or loop) keeps tracking the reference frequency and forces the corresponding end node, such as the end node 104A uplink laser signal (or laser frequency), to keep a required relative frequency difference to the target frequency (or reference). In an example, the accuracy is at 10 megahertz (MHz) level, and the channel space (in gigahertz (GHz)) can be configured flexibly. Optionally, the channel space depends on the frequency lock loop unit and the photodiode's bandwidth that determines the allowed maximum consequent radio frequency (RF) from beating the reference signal by the uplink laser signal of the end node 104A. Further, if the downlink laser source of the central node transceiver 112 is the comb laser (i.e., if the reference signal is generated from the comb laser), then the channel space is dependent on the laser frequency of the comb laser (or comb tone space). Therefore, the system 100A is easy to scale in comparison to conventional systems, as the system 100A may be scaled simply by increasing the reference frequency count or the baud rate of the management information (or modulating signal) of the end node 104A. Moreover, the frequency lock loop unit based architecture of the end nodes 104A to 104N is completely compatible with a power-split optical distribution network (ODN) infrastructure via frequency division multiplexing (FDM) and/or code division multiplexing (CDM) approach for multiple access in the uplink direction. Therefore, the proposed system 100A is easy to implement as compared to conventional systems because the system 100A relies only on the frequency lock loop unit in each end node 104A to 104N, which can be easily integrated with the end node transceivers 114A to 114N. Moreover, the frequency lock loop unit of the end node transceivers 114A to 114N has a high power sensitivity, low cost, supports a high split ratio with an accurate uplink wavelength control, and in certain scenarios the frequency lock loop unit can be based on low bandwidth component.

In accordance with an embodiment, each end node transceiver 114A to 114N further comprises a thermoelectrical cooler (TEC) and a current control unit for controlling the wavelength of the uplink laser signal based on the uplink laser tuning direction indications, and a digital signal processing (DSP) unit for generating an uplink user data to modulate the uplink laser signal directly or externally. In an example, the control unit of each end node transceiver 114A to 114N, is coupled to the thermoelectrical cooler (TEC) and the current control unit of the corresponding end node transceiver 114A. The thermoelectrical cooler (TEC) and the current control unit is configured to control the wavelength of the uplink laser signal of the uplink laser source based on the signal received from the control unit, such as the uplink laser tuning direction indications received from the control unit of the end node transceiver 114A. In other words, the output of the control unit is passed to the thermoelectrical cooler (TEC) and the current control unit so as to control the wavelength of the uplink laser signal based on the uplink laser tuning direction indications. Alternatively, thermoelectrical cooler and the current control unit are used to do coarse and fine adjustments of the uplink laser signal (or laser frequency) generated by the uplink laser source of the end node transceiver 114A, respectively, with high accuracy as compared to the conventional approach. In an example, the uplink laser source is also coupled to the digital signal processing (DSP) unit of the end transceiver, such as the end node transceiver 114A, so as to modulate the uplink laser signal of the uplink laser source. The uplink laser signal is modulated either directly or externally by the uplink user data, which is generated by the digital signal processing (DSP) unit of the end node transceiver 114A. Optionally, the uplink user data generated by the digital signal processing unit is initially passed through a digital to analog converter, and then the uplink user data is used in analog form to modulate the uplink laser signal. The modulated uplink laser signal is further used by the end nodes 104A to 104N for transmission of a modulated light over a shared optical fiber infrastructure with an accurate uplink wavelength control.

In accordance with an embodiment, each end node transceiver 114A to 114N comprises a splitter for splitting the reference signal into two parts, a photodiode (PD) for extracting the management information, a control unit (CU) for determining the target frequency and generating uplink laser tuning direction indications. Each end node transceiver 114A to 114N further comprises an uplink laser source for generating an uplink laser signal, a frequency lock loop (FLL) unit for generating the beating frequency. In other words, each end node transceiver 114A to 114N, includes the splitter, which is configured to split the reference signal into two parts (or portions). In an example, the reference signal is split into two parts with a ratio of 1:9, such that a small part of the reference signal is detected and recovered to abstract the broadcast management information. Moreover, a large part of the reference signal is fed to the frequency lock loop unit so as to generate the beating frequency. Thereafter, the small part of the reference signal is detected by the photodiode of each end node transceiver 114A to 114N. The photodiode of the corresponding end node transceiver 114A is configured to extract the management information from the small part of the reference signal. In other words, a small portion of the downlink signals is detected by the photodiode of the end node transceiver 114A so as to recover the broadcast management information. Optionally, the output of the photodiode is further processed through a clock and data recovery circuit (CDR) of the end node transceiver 114A so as to extract timing information from the data of the management information. Thereafter, the control unit (e.g., a micro control unit MCU)) of each of the end node transceivers 114A to 114N, such as the end node transceiver 114A is used to process the management information and to extract the target frequency the corresponding end node transceiver 114A, and also to generate the uplink laser tuning direction indications. In other words, the control unit manages the uplink laser tuning direction indications to enable the laser control uplink of the uplink laser source for a frequency scan, to identify the target (or reference) frequency. Moreover, the uplink laser source of each end node transceiver 114A to 114N, is used to generate the uplink laser signal, which is used by the end node transceiver 114A for further communication. Optionally, the uplink laser source is coupled to the frequency lock loop unit, which is further coupled to the control unit.

In an implementation, an isolator can be implemented in the uplink laser source (i.e., end node laser) output to stop entering the laser cavity. Therefore the uplink reflection will not affect the performance of each end node 104A to 104N. Moreover, the uplink reflection entering the frequency lock loop unit of each end node transceiver 114A to 114N will not cause any significant problem because the frequency lock loop unit performance relies on the reference signal (i.e., carrier signal) and is invulnerable to intensity noise.

In accordance with an embodiment, each end node transceiver 114A to 114N comprising a splitter for splitting the reference signal into two parts, further comprises a thermoelectrical cooler (TEC) and a current control unit for controlling the wavelength of the uplink laser signal based on the uplink laser tuning direction indications, and a digital signal processing (DSP) unit for generating an uplink user data to modulate the uplink laser signal directly or externally. In an example, the control unit of the end node transceiver 114A to 114N is coupled to the thermoelectrical cooler (TEC) and the current control unit of the corresponding end node transceive. The thermoelectrical cooler (TEC)

and the current control unit is configured to control the wavelength of the uplink laser signal of the uplink laser source based on the signal received from the control unit, such as the uplink laser tuning direction indications received from the control unit of the end node transceiver 114A. In other words, the output of the control unit is passed to the thermoelectrical cooler (TEC) and the current control unit so as to control the wavelength of the uplink laser signal based on the uplink laser tuning direction indications. The uplink laser signal is further modulated either directly or externally by the uplink user data, which is generated by the digital signal processing (DSP) unit of the end node transceiver 114A. Optionally, the uplink user data generated by the digital signal processing unit is initially passed through a digital to analog converter, then the uplink user data is used in analog form to modulate the uplink laser signal. The modulated uplink laser signal is further used by the end nodes 104A to 104N for transmission of a modulated light over a shared optical fiber infrastructure with an accurate uplink wavelength control.

In the present disclosure, the end node transceivers 114A to 114N in each end node 104A to 104N is configured for determining the target frequency by extracting the management information from the reference signal. The end node transceiver 114A to 114N in each end node 104A to 104N is further configured for generating a beating frequency by beating the reference signal with an uplink laser signal, and controlling a wavelength of the uplink laser signal to lock to the target frequency based on the beating frequency. In other words, each end node transceiver 114A to 114N of the each end node 104A to 104N is configured to extract the management information from the reference signal broadcasted by the central node 102. In an example, each end node transceiver 114A to 114N includes a photodiode to extract the management information from the reference signal, such as the photodiode of the end node transceiver 114A of the end node 104A is used to extract the management information from the reference signal received by the end node transceiver 114A. Thereafter, the target frequency is determined by each end node transceiver 114A to 114N from the data of the extracted management information. In an example, each end node transceiver 114A to 114N includes a control unit to determine the target frequency from the management information, such as the control unit of the end node transceiver 114A of the end node 104A is used to extract and determine the target frequency from the management information extracted by the end node transceiver 114A. Therefore, the management information is used by each end node transceiver 114A to 114N to indicate and assign the target frequency to each end node 104A to 104N. Further, each end node 104A to 104N will align its own frequency to the assigned target frequency. In other words, the management information indicates what target frequency each end node 104A to 104N will lock to. Consequently, alignment accuracy is determined by the frequency alignment approach (and apparatus) in each end node transceiver 114A to 114N. Thereafter, each end node transceiver 114A to 114N of the end nodes 104A to 104N is configured to generate the beating frequency by beating the reference signal with an uplink laser signal. For example, the end node transceiver 114A of the end node 104A is configured to generate the beating frequency for the end node transceiver 114A by beating the reference signal received by the end node transceiver 114A with the uplink laser signal. In an implementation, each end node transceiver 114A to 114N includes the frequency lock loop unit, which is used to generate the beating frequency. Thereafter, the beating frequency is used by each node transceiver 114A to 114N to control the wavelength of the uplink laser signal and also to lock the target frequency of the each end node transceiver 114A to 114N. For example, the beating frequency as generated by the end node transceiver 114A is used by the end node transceiver 114A to control the wavelength of the uplink laser signal of the end node transceiver 114A and also to lock the target frequency of the end node transceivers 114A. In an example, once each end node transceiver 114A to 114N is locked to the target frequency, then each end node transceiver 114A to 114N modulates an output of the uplink laser source (or an end node laser) and sends a modulated signal to uplink, such as the uplink laser signal. Therefore, wavelength (or frequency) control in each end node transceiver 114A to 114N is achieved with improved accuracy and flexibility. Beneficially, the proposed system 100A is particularly suitable for a low-cost systems based on directly modulated laser end nodes 104A to 104N and a shared uplink receiver. The proposed system 100A has the compatibility with power-split optical distribution networks (ODN). Therefore, the proposed system 100A is easy to implement as compared to a conventional systems, because the proposed system 100A relies on each end node 104A to 104N, which can be easily integrated with the end node transceivers 114A to 114N. Moreover, each end node transceivers 114A to 114N has a high power sensitivity, and a low cost which can support a high split ratio with an accurate uplink wavelength control, and in certain scenarios the frequency lock loop unit can be based on a low bandwidth component.

In accordance with an embodiment, the downlink laser source is configured for generating the reference signal with a single reference frequency. The management information indicates the target frequency assigned to each end node 104A to 104N by indicating a target frequency band on a pre-determined distance to the single reference frequency for each end node 104A to 104N. In an example, the downlink laser source is a continuous wave laser, and the reference signal is generated with a single reference frequency (or single reference tone, or down reference frequency). Thereafter, each end node transceiver 114A to 114N of each end node 104A to 104N are locked to a unique target frequency band on a pre-determined distance (or space) relative to the single reference frequency (or tone), which is indicated by the management information. In other words, in a single reference frequency case, each end node 104A to 104N are locked to the unique target frequency, with a space pre-decided by the central node 102 relative to the single reference frequency. For example, the management information indicates the target frequency assigned to the end node 104A by indicating the target frequency band, which is at a unique pre-determined distance to the single reference frequency of the downlink laser source. Similarly, the management information indicates the target frequency assigned to the end node 104B by indicating the target frequency band, which is at a unique pre-determined distance (i.e., same as that for the end node 104A) to the single reference frequency of the downlink laser source, as shown and described further in FIG. 4. In other words, the pre-determined distance to the single reference frequency of the downlink laser source is unique for each end node 104A to 104N. Therefore, each end node 104A to 104N are locked to the same carrier frequency (such as the target frequency band), and the reference signal of the downlink laser source (or the continuous wave laser) is modulated by the same management information (or low-speed management data). Moreover, each end node 104A to 104N sends its data over the target frequency band (optical carrier) via a directly modulator laser (DML) or an external modulator (not shown). As a result, a low bandwidth is required for each end node transceiver 114A to 114N, and a high bandwidth is required of the frequency lock loop unit of each end node transceiver 114A to 114N.

In an implementation, if the pre-determined distance to the single reference frequency for each end node 104A to 104N is zero, then each end node transceiver 114A to 114N of each end node 104A to 104N are locked to the same target frequency band, which is indicated by the management information. Moreover, subcarrier modulation (SCM) is applied to the uplink laser signal of each end node transceiver 114A to 114N. Thereafter, each end node 104A to 104N upshifts its own uplink laser signal to a uniquely assigned target frequency band and generates the uplink user data (e.g., using a digital signal processing unit) so as to modulate the uplink laser signal directly (or externally). In other words, each end node 104A to 104N upshifts its own uplink laser signal to the uniquely assigned radio frequency (RF) band. The uplink user data is further de-multiplexed with a digital signal processing (DSP) in the central node transceiver 112.

In accordance with an embodiment, the downlink laser source is configured for generating the reference signal with a frequency comb comprising a plurality of reference tones, and the management information indicates the target frequency assigned to each end node 104A to 104N by indicating a reference tone of the frequency comb assigned to each end node 104A to 104N. In an example, the downlink laser source is a continuous wave comb frequency laser (or a continuous wave laser array), and the reference signal is generated with the frequency comb, which further comprises a plurality of reference tones (or multiple reference tones, a plurality of reference frequencies). Thereafter, each end node transceiver 114A to 114N of each end node 104A to 104N are locked to the unique reference tone of the frequency comb as indicated by the data of the management information. For example, the management information indicates the target frequency, which is assigned to the end node 104A by indicating a reference tone of the frequency comb assigned to the end node 104A. Similarly, the management information indicates the target frequency, which is assigned to the end node 104B by indicating a reference tone of the frequency comb assigned to the end node 104B, as shown and described further in FIG. 4. In other words, in the multiple reference tones case, each end node 104A to 104N, is locked to a unique reference tone (or same carrier frequency). As a result, the frequency lock loop unit and the end node transceivers 114A to 114N can use low bandwidth components. In an example, a subcarrier modulation is also required to modulate the uplink laser signal, which is transmitted in the target frequency band assigned to each end node 104A to 104N.

In accordance with an embodiment, a number of the reference tones of the frequency comb is less than a number of the end nodes 104A to 104N, and the management information indicates a reference tone of the frequency comb assigned to each end node 104A to 104N and a target frequency band on a pre-determined distance to the reference tone for each end node 104A to 104N. In an example, when the downlink laser source is a continuous wave comb frequency laser (or a continuous wave laser array), the reference signal is generated with the frequency comb, wherein the number of the reference tones (or frequencies) of the frequency comb is less than the number of end nodes 104A to 104N. Therefore, the reference tone of the frequency comb as indicated by the management information is assigned to each end node 104A to 104N. Moreover, the reference tone is further used to indicate the target frequency band for each end node 104A to 104N, which is at a pre-determined distance to the reference tone for each end node 104A to 104N. For example, the management information indicates a reference tone of the frequency comb assigned to end node 104A and a target frequency band on a pre-determined distance to the reference tone for the end node 104A. Similarly, the management information indicates the target frequency assigned to the end node 104B such that the management information indicates a reference tone of the frequency comb assigned to the end node 104B and a target frequency band on the pre-determined distance (i.e., same as that for the end node 104A) to the reference tone for the end node 104B, as shown and described further in FIG. 4. Thus, several end nodes 104A to 104N lock to the same reference tone. In an example, once each end node 104A to 104N is locked, each end node 104A to 104N laser frequency will track the reference tone dynamically and stabilize the end node laser frequency within an acceptable deviation range, typically ±10 MegaHertz (MHz). Moreover, a low bandwidth is required for each end node transceiver 114A to 114N, and a moderate bandwidth is required for the frequency lock loop unit of each end node transceiver 114A to 114N. In an implementation, when the number of reference tones of the frequency comb is less than a number of the end nodes, the management information can indicate the target frequency assigned to each end node 104A to 104N by indicating a reference tone (identical for several end nodes) assigned to each end node 104A to 104N without setting any pre-determined distances to the reference tone. In this case the end node transceivers can be implemented with a moderate bandwidth, while the frequency lock loop unit requires a low bandwidth.

In accordance with an embodiment, each end node transceiver 114A to 114N is configured for applying a subcarrier modulation (SCM) or a code-division multiplexing (CDM) to the uplink laser signal transmitted in the target frequency band assigned to several end nodes 104A to 104N. In an example, the downlink laser source (e.g., a continuous wave laser) generates the reference signal with a single reference frequency, and the management information indicates the target frequency assigned to each end node 104A to 104N by indicating a target frequency band on a pre-determined distance to the single reference frequency for each end node 104A to 104N. Then, in such a case, a shared frequency topology is used, where the end nodes 104A to 104N are divided into different groups, and members of the same group share the same target frequency band. For example, the end nodes 104A to 104C are divided into a first group, and the end nodes 104C to 104F are divided into a second group, then members of the first group, such as the end nodes 104A to 104C share the same target frequency band, and the members of the second group, such as the end nodes 104C to 104F share the same target frequency band. In other words, several end nodes 104A to 104N are locked to the same target frequency band, and a cost-effective system 100A is obtained with improved optical power sensitivity. Optionally, the target frequency band of two different groups can be the same or different. In an example, the management information of each group is multiplexed via subcarrier modulation (or via code division multiplexing (CDM)) approach for multiple access in the uplink direction. Correspondingly, a digital signal processing unit of the central node transceiver 112 goes through two-stage de-multiplexing steps, including the frequency division multiplexing (FDM) and the code division multiplexing (CDM) de-multiplexing. However, in such a case, a moderate bandwidth is required for the end node transceivers 114A to 114N as well as for the frequency lock loop unit of each end node 104A to 104N.

In another example, the downlink laser source (e.g., a continuous wave comb frequency laser, or a continuous wave laser array) of the central node 102 is configured for generating the reference signal with the frequency comb comprising a plurality of reference tones, and the number of the reference tones of the frequency comb is less than a number of the end nodes 104A to 104N. Therefore, shared frequency topology can be used in such case, where the end nodes 104A to 104N are divided into different groups and members of the same group share the same target frequency. In other words, several end nodes 104A to 104N are locked to the same frequency band, and a cost-effective system 100A is obtained with improved optical power sensitivity. Further, the management information of each group is multiplexed via code division multiplexing (CDM). Correspondingly, the digital signal processing unit of the central node transceiver 112 goes through two-stage de-multiplexing steps, including the frequency division multiplexing (FDM) and the code division multiplexing (CDM) based de-multiplexing. However, in such a case, a moderate bandwidth is required for the end node transceivers 114A to 114N, and low bandwidth is required for the frequency lock loop unit of each end node 104A to 104N.

In an implementation, the uplink receiver, such as the end node transceiver 114A incorporates a single coherent receiver, such as the central node transceiver 112 to detect the frequency division multiplexing (or the code division multiplexing) based uplink laser signal from all end nodes 104A to 104N, with improved optical power sensitivity. Therefore, the proposed solution is also cost-effective since each end node 104A to 104N share the same downlink coherent receiver, such as the central node transceiver 112.

In accordance with an embodiment, a number of the reference tones of the frequency comb is equal or larger than a number of the end nodes 104A to 104N, and each end node transceiver 114A to 114N is configured for applying a baseband modulation or a subcarrier modulation (SCM) to the uplink laser signal transmitted at the target frequency. In other words, if the downlink laser source is a continuous wave comb frequency laser (or a continuous wave laser array), and the number of the reference tones of the frequency comb is equal or larger than the number of the end nodes 104A to 104N. Then, the pre-determined distance to the reference tone for each end node 104A to 104N can be zero for each end node 104A to 104N. Therefore, each end node 104A to 104N is locked to an identical target frequency (or uniquely assigned reference tone), and is configured to modulate the uplink laser signal, which is to be transmitted at identically locked target frequency. Further, the uplink laser signal is modulated using a radio frequency (RF) modulating signal, which can be a baseband signal or the subcarrier modulation (SCM) signal via upshifting the baseband signal to a band very close to the optical carrier so as to achieve a high power sensitivity. Therefore, each end node transceiver 114A to 114N and the frequency lock loop unit can have a low bandwidth. Moreover, the system 100A can be easily scaled to a greater number of end nodes 104A to 104N by simply increasing the reference tone count (or the baud rate) of the end nodes 104A to 104N modulating signal.

In accordance with an embodiment, each end node transceiver 114A to 114N is further configured for splitting the reference signal into two parts, wherein the management information is extracted from a first part of the reference signal, and the beating frequency is generated by beating a second part of the reference signal with the uplink laser signal. In other words, each end node transceiver 114A to 114N splits the downlink reference signal and extracts the management information from one part of the reference signal. In an example, a second part of the reference signal is applied to the frequency lock loop unit of each end node 104A to 104N, where the second part of the reference signal beats with the uplink laser signal (or laser output) of each end node 104A to 104N and generate the beating frequency. In an implementation, the frequency lock loop unit of each end node 104A to 104N further analyzes the beating frequency and feeds the conclusion as an indication to the control unit (or laser control) to force the laser frequency to lock to a frequency with a required difference relative to optical reference frequency, such as the target frequency. Therefore, it facilitates to lock to the target frequency based on the beating frequency with high accuracy. Moreover, once each end node 104A to 104N are locked to the target frequency, then each end node transceiver 114A to 114N modulates the uplink laser signal and sends the modulated signal to the uplink transmission. Thereafter, the central node transceiver 112 applies a single coherent receiver to detect all the end node uplink data, such as the uplink laser signal, and the data from each end node 104A to 104N is de-multiplexed in the digital signal processing unit of the central node 102.

In accordance with an embodiment, the polarization scrambler (PS) has a frequency of the state of polarization (SOP) variation enabling the frequency lock loop (FLL) unit in each end node 104A to 104N to stably lock to the target frequency. In other words, the polarization scrambler of the central node transceiver 112 has a frequency of the state of polarization variation, which is used to enable the frequency lock loop unit in each end node 104A to 104N. In an implementation, the frequency lock loop unit of each end node 104A to 104N detects an average power of the beating frequency by integrating the power over a time period determined by a loop bandwidth, such as the bandwidth of the frequency lock loop unit. Therefore, the state of polarization (SOP) variation enabled by the polarization scrambler from the central node 102 is faster than the loop bandwidth, such as the bandwidth of the frequency lock loop unit. Moreover, the frequency lock loop unit is advantageously able to detect the beating frequency signal power in all cases and avoid the issue of polarization orthogonality between two reference signals (or optical input signals). An alternative to polarization scrambler is to apply polarization diversity detection in the frequency lock loop unit, which requires two polarization splitters and two photodiodes.

In accordance with an embodiment, the frequency lock loop (FLL) unit comprises a photodiode (PD), a transimpedance amplifier (TIA), a phase frequency detector (PFD) and a proportion and integration (PI) control feedback block. In an example, the downlink signal, such as the reference signal, is split into two portions at each end node 104A to 104N, such as with a ratio of 1:9. Moreover, a small portion is detected and recovered to abstract the broadcast management information, which further indicates a reference tone. The management information of the reference tone is fed to a micro control unit (MCU), such as the control unit, which manages to enable the laser control for a frequency scan so as to identify the target frequency (or reference frequency). The remainder downlink signal is fed into the frequency lock loop unit together with a portion of an output of the uplink laser source (or end node laser), which is detected by the photodiode of the frequency lock loop unit. In general, the photodiode of the frequency lock loop unit is used to convert the optical signal into an electrical signal, and the bandwidth of the photodiode depends on a targeted beating frequency (or radiofrequency) of the frequency lock loop unit. The output of the photodiode is fed to the transimpedance amplifier for further amplification. In an example, the transimpedance amplifier is an inverting amplifier with negative feedback, which is used to convert an input current signal, such as the output of the photodiode, into a voltage signal. Thereafter, the phase frequency detector (e.g., a logic detector) is used to detect the voltage signal and generate the beating frequency, and the beating frequency is further processed through the proportion and integration control feedback block. In general, the proportion and integration control feedback block is used to apply few corrections to the beating frequency, based on the wavelength of the photodiode and also on the targeted beating frequency (or radiofrequency) of the frequency lock loop unit. Moreover, the consequent beating frequency indicates that the wavelength of each end node 104A to 104N is getting closer to (or further apart from) the reference tone, which is critical feedback from the proportion and integration control feedback block to the control unit (or laser control) so as to force the laser wavelength to move to a right direction. Therefore, the frequency lock loop unit of the end node transceivers 114A to 114N has a high power sensitivity, and a low cost. Further, the frequency lock loop unit can support a high split ratio with an accurate uplink wavelength control, and in certain scenarios the frequency lock loop unit can be based on a low bandwidth component.

Therefore, system 100A address the wavelength (or frequency) control issue with high accuracy, flexibility, low-cost potential. Moreover, the system 100A has compatibility with existing power-split optical distribution networks (ODN), tolerant to uplink reflection, and has high power sensitivity. The system 100A is easy to implement as compared to conventional systems as the system 100A relies only on the frequency lock loop unit in each end node 104A to 104N, which can be easily integrated with the end node transceivers 114A to 114N at chip level. In addition, the system 100A could become standard-relevant for the passive optical network (PON) systems by using non-TDM multiplexing architecture. The system 100A is particularly suitable for low-cost point to multi-point systems based on self-coherent receivers, such as the central node transceiver 112.

Figure 1B:
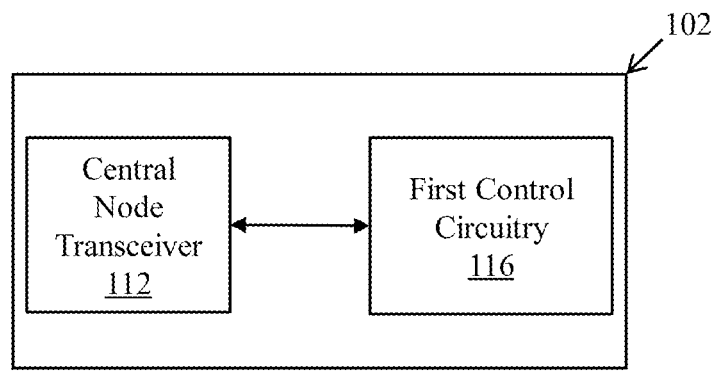
FIG. 1B is a block diagram that illustrates various exemplary components of a central node, in accordance with an embodiment of the present disclosure.

FIG. 1B is a block diagram that illustrates various exemplary components of a central node, in accordance with an embodiment of the present disclosure. FIG. 1B is described in conjunction with elements from FIG. 1A. With reference to FIG. 1B, there is shown the central node 102 that includes the central node transceiver 112 and a first control circuitry 116.

The first control circuitry 116 is configured to transmit the reference signals from the central node transceiver 112 of the central node 102 to each end node transceiver 114A to 114N of the end nodes 104A to 104N. In an implementation, the first control circuitry 116 may be a general-purpose processor. Examples of the first control circuitry 116 include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. It will be appreciated that the operations performed at the central node transceiver 112 are potentially performed by the first control circuitry 116 of the central node 102. Optionally, the central node 102 may further include a memory for storage purposes (not shown).

Figure 1C:
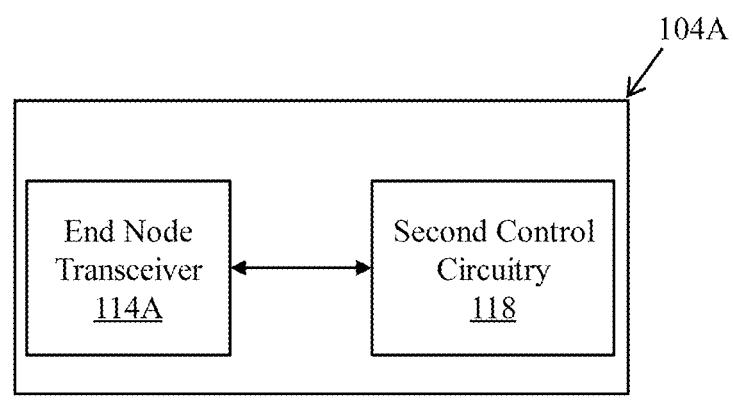
FIG. 1C is a block diagram that illustrates various exemplary components of an end node, in accordance with an embodiment of the present disclosure.

FIG. 1C is a block diagram that illustrates various exemplary components of an end node, in accordance with an embodiment of the present disclosure. FIG. 1C is described in conjunction with elements from FIG. 1A. With reference to FIG. 1C, there is shown the end node 104A that includes the end node transceiver 114A and a second control circuitry 118.

The second control circuitry 118 is configured to receive the reference signals from the central node transceiver 112 of the central node 102. In an implementation, the second control circuitry 118 may be a general-purpose processor. Examples of the second control circuitry 118 include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. It will be appreciated that the operations performed at the end node transceiver 114A are potentially performed by the second control circuitry 118 of the end node 104A. Optionally, the end node 104A may further include a memory for storage purposes (not shown).

Figure 2:
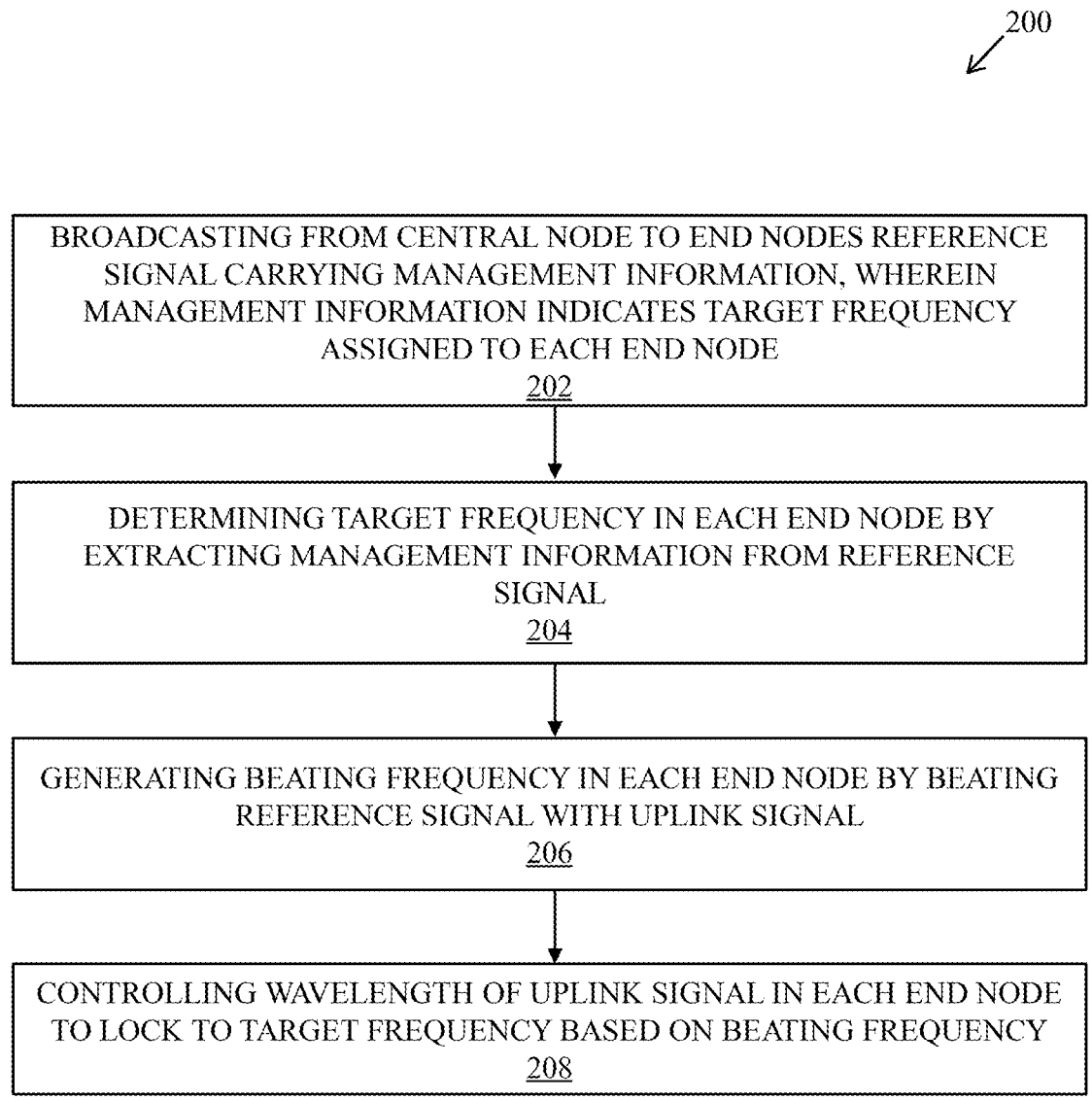
FIG. 2 is a flowchart of a method of wavelength control in a passive optical network, in accordance with an embodiment of the present disclosure.

FIG. 2 is a flowchart of a method of wavelength control in a passive optical network, in accordance with an embodiment of the present disclosure. FIG. 2 is described in conjunction with elements from FIG. 1A. With reference to FIG. 2, there is shown a method 200. The method 200 includes steps 202 to 208.

In another aspect the present disclosure provides a method 200 of wavelength control in a passive optical network, PON, with point to multi-point, P2MP, topology comprising a central node 102 and end nodes 104A to 104N, the method comprising:

broadcasting from the central node 102 to end nodes 104A to 104N a reference signal carrying a management information, wherein the management information indicates a target frequency assigned to each end node 104A to 104N, determining the target frequency in each end node 104A to 104N by extracting the management information from the reference signal, generating a beating frequency in each end node 104A to 104N by beating the reference signal with an uplink laser signal, and controlling a wavelength of the uplink laser signal in each end node 104A to 104N to lock to the target frequency based on the beating frequency.

The method 200 of wavelength control in a passive optical network (PON) with point to multi-point (P2MP) topology comprises a central node 102 and end nodes 104A to 104N. In other words, the method 200 includes the central node 102 and the end nodes 104A to 104N, and the method is used for communication from one point to multi-point in the passive optical network, such as from the central node 102 to end nodes 104A to 104N. The passive optical network corresponds to a shared optical fiber (or a fiber-optic) network utilizing a point to multi-point topology (P2MP). The point to multi-point (P2MP) topology (or communication) is based on a power-split network where a downlink signal, such as reference signal (or optical frequencies, wavelengths) is broadcasted from the central node 102 to all the end nodes 104A to 104N. The method 200 is also compatible with the power-split network (or power splitter) based on point to multi-point (P2MP) fiber infrastructure and also for a continuous mode (not burst mode) operation with low latency and a low cost.

At step 202, the method 200 comprises broadcasting from the central node 102 to end nodes 104A to 104N a reference signal carrying a management information, wherein the management information indicates a target frequency assigned to each end node 104A to 104N. In other words, the method 200 is used to facilitate the provision of the reference signal (or a downlink signal) from the central node 102 to the end nodes 104A to 104N. At step 202, the central node transceiver 112 (e.g., a coherent transceiver) of the central node 102 broadcasts the reference signal as well as the management information to each end node 104A to 104N. In an example, the reference signal, as well as the management information, is known as a downlink signal. In other words, at step 202, the central node 102 centrally provides the reference signal modulated by the management information to each end node 104A to 104N. The method 200 applies a single coherent receiver, such as the central node transceiver 112, which is used to detect all the end node uplink data so as to address the wavelength (or frequency) control issue with great accuracy, flexibility, low-cost potential. Moreover, the method 200 has compatibility with existing power-split optical distribution networks (ODN), tolerance to uplink reflection, and has high power sensitivity. In addition to that, the method 200 could become standard-relevant for the passive optical network (PON) systems by using non-time division multiplexing (TDM) multiplexing architecture. The proposed method 200 is particularly suitable for low-cost point to multi-point systems based on self-coherent receivers, such as the central node transceiver 112, where cost pressure could motivate vendors to pursue a standard or multi-source agreement.

In accordance with an embodiment, the broadcasting from the central node 102 to end nodes 104A to 104N the reference signal comprises generating the reference signal by a downlink laser source, varying a state of polarization (SOP) of the reference signal by a polarization scrambler (PS) and modulating the reference signal by a data of the management information by a modulator. In other words, the downlink laser source of the central node transceiver 112 comprises generating the reference signal. In an example, the reference signal received from the downlink laser source is passed through a semiconductor optical amplifier (SOA), where the semiconductor optical amplifier is configured to process and amplify the reference signal. Thereafter, the reference signal is passed through the polarization scrambler (PS), where the state of polarization (SOP) of the reference signal is varied by the polarization scrambler of the central node transceiver 112. In an example, the polarization scrambler is based on a electro-optical materials, and the state of polarization corresponds to different polarization states, such as linear polarization state, circular polarization state, and elliptical polarization state. Therefore, the polarization scrambler of the central node transceiver 112 is used to mitigate polarization related impairments of the reference signal. The reference signal is further modulated by the data of the management information (e.g., a modulating signal), where modulation is performed using the modulator of the central node transceiver 112. Therefore, the central node transceiver 112 of the central node 102 is capable of generating the reference signal with different frequencies (tones), which carries the data of the management information. Moreover, the central node transceiver 112 of the central node 102 broadcasts the reference signal along with the data of the management information to each end node 104A to 104N. Thus, the central node transceiver 112 realizes the frequency allocation and alignment in the passive optical network (PON) over the point to multi-point (P2MP) topology (or communication network).

In accordance with an embodiment, the modulating of the reference signal comprises modulating the reference signal by a low-speed data. In other words, the management information is the low-speed data, such as one kilobit/see (Kb/s, which is used by the central node transceiver 112 to modulate the reference signal. Therefore, due to the low-speed management information, the reception sensitivity of each end user transceiver that detects and recovers the management data is improved.

At step, 204, the method 200 further comprises determining the target frequency in each end node 104A to 104N by extracting the management information from the reference signal. In other words, the target frequency is determined by each end node transceiver 114A to 114N of the end nodes 104A to 104N from the data of the extracted management information. In an example, each end node transceiver 114A to 114N includes a control unit to determine the target frequency from the management information. For example, a control unit of the end node transceiver 114A of the end node 104A is used to extract the to determine the target frequency from the management information extracted by the end node transceiver 114A. Therefore, the management information is used by each end node transceiver 114A to 114N to indicates and assign the target frequency to each end node 104A to 104N. Further, each end node 104A to 104N will align its own frequency to the assigned target frequency. In other words, the management information indicates what target frequency each end node 104A to 104N will lock to. Consequently, the alignment accuracy is determined by the frequency alignment approach (and apparatus) in each end node transceiver 114A to 114N.

At step 206, the method 200 further comprises generating a beating frequency in each end node 104A to 104N by beating the reference signal with an uplink laser signal. In other words, each end node transceiver 114A to 114N of each end node 104A to 104N comprises generating the beating frequency by beating the reference signal with an uplink laser signal. For example, the end node transceiver 114A of the end node 104A comprises generating the beating frequency for the end node transceiver 114A by beating the reference signal received by the end node transceiver 114A with the uplink laser signal. In an implementation, each end node transceiver 114A to 114N includes the frequency lock loop unit, which is used to generate the beating frequency.

In accordance with an embodiment, the method 200 further comprises splitting the reference signal into two parts in each end node transceiver 114A to 114N, wherein the management information is extracted from a first part of the reference signal, and the beating frequency is generated by beating a second part of the reference signal with the uplink laser signal. In other words, each end node transceiver 114A to 114N splits the downlink reference signal and extracts the management information from one part of it. In an example, a second part is applied to the frequency lock loop unit of each end node 104A to 104N, where the second part of the reference signal beats with the uplink laser signal (or laser output) of each end node 104A to 104N and generate the beating (or a radio) frequency. In an implementation, the frequency lock loop unit of each end node 104A to 104N further analyzes the beating frequency and feeds the conclusion as an indication to the control unit (or laser control)

to force the laser frequency to lock to a frequency with a required difference relative to the optical reference frequency, such as the target frequency. Therefore, it facilitates locking to the target frequency of each end node 104A to 104N based on the beating frequency with high accuracy. Moreover, once each end node transceiver 114A to 114N is locked to the target frequency, the end node transceiver 114A to 114N modulates the uplink laser signal and sends the modulated signal to the uplink transmission. Thereafter, the central node transceiver 112 applies a single coherent receiver to detect all the end node uplink data, such as the uplink laser signal, and the data from each end node 104A to 104N is de-multiplexed in the digital signal processing unit of the central node 102.

In accordance with an embodiment, the generating of the beating frequency in each end node 104A to 104N comprises applying a frequency lock loop (FLL). In other words, the frequency lock loop unit of each end node transceiver 114A to 114N comprises detecting the large part of the reference signal as broadcasted by the central node 102 and generate the beating frequency from the large part of the reference signal (or the downlink signals). In an example, the frequency lock loop unit is proposed in each end node transceiver 114A to 114N so as to enable its uplink laser signal (or a laser frequency) locked to the assigned target frequency (or reference). Moreover, the control unit (or loop) keeps tracking the reference frequency and forces the corresponding end node, such as the end node 104A uplink laser signal (or laser frequency), to keep a required relative frequency difference to the target frequency (or reference). In an example, the accuracy is at 10 megahertz (MHz) level, and the channel space (in gigahertz (GHz)) of the international telecommunication union (ITU) can be flexibly configured. Optionally, the channel space depends on the frequency lock loop unit and the photodiode's bandwidth that determines the allowed maximum consequent radio frequency (RF) from beating the reference signal by the uplink laser signal of the end node 104A. In general, if the downlink laser source of the central node transceiver 112 is the comb laser (i.e., if the reference signal is generated from the comb laser), then the channel space is dependent on the laser frequency of the comb laser (or comb tone space). Therefore, the approach is easy to scale by simply increasing the reference frequency count or the baud rate of the management information (or modulating signal) of the end node 104A. Moreover, the frequency lock loop unit based architecture of the end nodes 104A to 104N is completely compatible with a power-split optical distribution network (ODN) infrastructure via frequency division multiplexing (FDM) and (or) code division multiplexing (CDM) approach for multiple access in the uplink direction.

At step 208, the method 200 further comprises controlling a wavelength of the uplink laser signal in each end node 104A to 104N to lock to the target frequency based on the beating frequency. In other words, the beating frequency is used by each node transceiver 114A to 114N to control the wavelength of the uplink laser signal and also to lock the target frequency of each end node transceiver 114A to 114N. For example, the beating frequency as generated by the end node transceiver 114A is used by the end node transceiver 114A to control the wavelength of the uplink laser signal of the end node transceiver 114A and also to lock the target frequency of the end node transceivers 114A. In an example, once each end node transceiver 114A to 114N is locked to the target frequency, then each end node transceiver 114A to 114N modulates an output of the uplink laser source (or an end node laser) and sends a modulated signal to uplink, such as the uplink laser signal. Therefore, wavelength (or frequency) control in each end node transceiver 114A to 114N is achieved with improved accuracy and flexibility. Beneficially, the proposed method 200 is particularly suitable for low-cost systems (or low-cost potential) based on directly modulated laser end nodes 104A to 104N and a shared uplink receiver. Further, the proposed method 200 has compatibility with the power-split optical distribution networks (ODN).

In accordance with an embodiment, the generating of the reference signal comprises generating the reference signal with a single reference frequency, and the management information indicates the target frequency assigned to each end node 104A to 104N by indicating a target frequency band on a pre-determined distance to the single reference frequency for each end node 104A to 104N. In an example, the downlink laser source is a continuous wave laser, and the reference signal is generated with a single reference frequency (or single reference tone, or down reference frequency). Thereafter, each end node transceiver 114A to 114N of each end node 104A to 104N are locked to a unique target frequency band with a pre-determined distance (or space) relative to the single reference frequency, as indicated by the management information. In other words, in a single reference frequency case, each end node 104A to 104N are locked to the unique target frequency, with a space pre-decided by the central node 102 relative to the single reference frequency. For example, the management information indicates the target frequency assigned to the end node 104A by indicating the target frequency band, which is at a unique pre-determined distance to the single reference frequency of the downlink laser source. Similarly, the management information indicates the target frequency assigned to the end node 104B by indicating the target frequency band, which is at a unique pre-determined distance (i.e., same as that for the end node 104A) to the single reference frequency of the downlink laser source, as shown and described further in FIG. 4. In other words, the pre-determined distance to the single reference frequency of the downlink laser source is unique for each end node 104A to 104N. Therefore, each end node 104A to 104N are locked to the same carrier frequency (such as the target frequency band), and the reference signal of the downlink laser source (or the continuous wave laser) is modulated by the same management information (or low-speed management data). Moreover, each end node 104A to 104N sends its data over the target frequency band (optical carrier) via a directly modulator laser (DML) or an external modulator (not shown). As a result, low bandwidth is required for each end node transceiver 114A to 114N, and high bandwidth is required of the frequency lock loop unit of each end node transceiver 114A to 114N.

In an implementation, if the pre-determined distance to the single reference frequency for each end node 104A to 104N is zero, then each end node transceiver 114A to 114N of each end node 104A to 104N are locked to the same target frequency band with as indicated by the management information. Moreover, subcarrier modulation (SCM) is applied to the uplink laser signal of each end node transceiver 114A to 114N. Thereafter, each end node 104A to 104N upshifts its own uplink laser signal to an uniquely assigned target frequency band and generates the uplink user data (e.g., using a digital signal processing unit) so as to modulate the uplink laser signal directly (or externally). In other words, each end node 104A to 104N upshifts its own uplink laser signal to the uniquely assigned radio frequency (RF) band.

The uplink user data is further de-multiplexed with a digital signal processing (DSP) in the central node transceiver 112.

In accordance with an embodiment, the generating of the reference signal comprises generating the reference signal with a frequency comb comprising a plurality of reference tones, and the management information indicates the target frequency assigned to each end node 104A to 104N by indicating a reference tone of the frequency comb assigned to each end node 104A to 104N. In an example, the downlink laser source is a continuous wave comb frequency laser (or a continuous wave laser array), and the reference signal is generated with the frequency comb, which further comprises a plurality of reference tones (or multiple reference tones, a plurality of reference frequencies). Thereafter, each of the end node transceivers 114A to 114N of each end node 104A to 104N are locked to the same reference tone of the frequency comb as indicated by the data of the management information. For example, the management information indicates the target frequency, which is assigned to the end node 104A by indicating a reference tone of the frequency comb assigned to the end node 104A. Similarly, the management information indicates the target frequency, which is assigned to the end node 104B by indicating a reference tone of the frequency comb assigned to the end node 104B, as shown and described further in FIG. 4. In other words, in the multiple reference tones case, each end node 104A to 104N is locked to an unique reference tone (or same carrier frequency). As a result, the frequency lock loop unit and the end node transceivers 114A to 114N can use low bandwidth components. In an example, a subcarrier modulation may also required to modulate the uplink laser signal, which is transmitted in the target frequency band assigned to each end node 104A to 104N.

In accordance with an embodiment, a number of the reference tones of the frequency comb is less than a number of the end nodes 104A to 104N, and the management information indicates a reference tone of the frequency comb assigned to each end node 104A to 104N and a target frequency band on a pre-determined distance to the reference tone for each end node 104A to 104N. In other words, the downlink laser source is a continuous wave comb frequency laser (or a continuous wave laser array) and the reference signal is generated with the frequency comb, wherein the number of the reference tones (or frequencies) of the frequency comb is less than the number of end nodes 104A to 104N. Therefore, the reference tone of the frequency comb as indicated by the management information is assigned to each end node 104A to 104N. Moreover, the reference tone is further used to indicate the target frequency band for each end node 104A to 104N, which is at a pre-determined distance to the reference tone for each end node 104A to 104N. For example, the management information indicates a reference tone of the frequency comb assigned to the end node 104A and a target frequency band on a pre-determined distance to the reference tone for the end node 104A. Similarly, the management information indicates the target frequency assigned to the end node 104B such that the management information indicates a reference tone of the frequency comb assigned to the end node 104B and a target frequency band on a pre-determined distance (i.e., same as that for the end node 104A) to the reference tone for end node 104B, as shown and described further in FIG. 4. Thus, several end nodes 104A to 104N lock to the same reference tone. In an example, once each end node 104A to 104N is locked, each end node 104A to 104N laser frequency will track the reference tone dynamically and stabilize the end node laser frequency within an acceptable deviation range, typically ±10 MegaHertz (MHz). Moreover, a low bandwidth is required for each end node transceiver 114A to 114N, and a moderate bandwidth is required for the frequency lock loop unit of each end node transceiver 114A to 114N. In an implementation, when the number of reference tones of the frequency comb is less than the number of the end nodes, the management information can indicate the target frequency assigned to each end node 104A to 104N by indicating a reference tone (identical for several end nodes) assigned to each end node 104A to 104N without setting any pre-determined distances to the reference tone. In this case the end node transceivers 114A to 114N can be implemented with a moderate bandwidth, while the frequency lock loop unit requires a low bandwidth.

In accordance with an embodiment, the method 200 further comprises applying a subcarrier modulation, SCM, or a code-division multiplexing (CDM) in each end node transceiver 114A to 114N to the uplink laser signal transmitted in the target frequency band assigned to several end nodes 104A to 104N. In an example, the downlink laser source (e.g., a continuous wave laser) generates the reference signal with a single reference frequency, and the management information indicates the target frequency assigned to each end node 104A to 104N by indicating a target frequency band on a pre-determined distance to the single reference frequency for each end node 104A to 104N. In such a case, a shared frequency topology is used, where the end nodes 104A to 104N are divided into different groups, and members of the same group share the same target frequency band. For example, the end nodes 104A to 104C are divided into a first group, and the end nodes 104C to 104F are divided into a second group, then a member of the first group share, such as the end nodes 104A to 104C share the same target frequency band, and the members of the second group, such as the end nodes 104C to 104F share the same target frequency band. Optionally, the target frequency band of two different groups can be the same or different. In an example, the management information of each group are multiplexed via subcarrier modulation (or via code division multiplexing (CDM)) approach for multiple access in the uplink direction. Correspondingly, a digital signal processing unit of the central node transceiver 112 goes through two-stage de-multiplexing steps, including the frequency division multiplexing (FDM) and the code division multiplexing (CDM) de-multiplexing. In other words, several end nodes 104A to 104N are locked to the same frequency band, and a cost-effective method 200 is obtained with improved optical power sensitivity. However, in such a case, a moderate bandwidth is required for the end node transceivers 114A to 114N as well as for the frequency lock loop unit of each end node 104A to 104N.

In another example, the downlink laser source (e.g., a continuous wave comb frequency laser, or a continuous wave laser array) of the central node 102 is configured for generating the reference signal with a frequency comb comprising a plurality of reference tones, and the number of the reference tones of the frequency comb is less than a number of the end nodes 104A to 104N, then again shared frequency topology is used, where the end nodes 104A to 104N are divided into different groups and members of the same group share the same target frequency. For example, the management information of each group is multiplexed via code division multiplexing (CDM). Correspondingly, the digital signal processing unit of the central node transceiver 112 goes through two-stage de-multiplexing steps, including the frequency division multiplexing (FDM) and the code division multiplexing (CDM) based de-multiplexing. In other words, several end nodes 104A to 104N are locked to the same frequency band, and a cost-effective method 200 is obtained with improved optical power sensitivity. However, in such a case, a moderate bandwidth is required for the end node transceivers 114A to 114N, and low bandwidth is required for the frequency lock loop unit of each end node 104A to 104N.

In other words, the uplink receiver, such as the end node transceiver 114A, incorporates a single coherent receiver, such as the central node transceiver 112 to detect the frequency division multiplexing (or the code division multiplexing) based uplink laser signal from all end nodes 104A to 104N, with improved optical power sensitivity. The proposed solution is also cost-effective since all end nodes 104A to 104N share the same uplink coherent receiver, such as the central node transceiver 112.

In accordance with an embodiment, a number of the reference tones of the frequency comb is equal or larger than a number of the end nodes 104A to 104N, and the method 200 further comprises applying a baseband modulation or a subcarrier modulation (SCM) in each end node transceiver 114A to 114N to the uplink laser signal transmitted at the target frequency. In other words, if the downlink laser source is a continuous wave comb frequency laser (or a continuous wave laser array, and the number of the reference tones of the frequency comb is equal or larger than the number of the end nodes 104A to 104N. Then, the pre-determined distance to the reference tone for each end node 104A to 104N can be zero for each end node 104A to 104N. Therefore, each end node 104A to 104N is locked to an identical target frequency (or uniquely assigned reference tone) and configured to modulate the uplink laser signal, which is to be transmitted at the identically locked target frequency. Further, the uplink laser signal is modulated using a radio frequency (RF) modulating signal, which can be a baseband signal or the subcarrier modulation (SCM) signal via upshifting the baseband signal to a band very close to the optical carrier so as to achieve a high power sensitivity. Therefore, each end node transceiver 114A to 114N and the frequency lock loop unit can have a low bandwidth. Moreover, the method 200 can be easily scaled to a greater number of end nodes 104A to 104N by simply increasing the reference tone count (or the baud rate) of the end nodes 104A to 104N modulating signal.

In accordance with an embodiment, the varying of the state of polarization (SOP) of the reference signal in the central node 102 has a frequency enabling the frequency lock loop (FLL) in each end node 104A to 104N to stably lock to the target frequency. In other words, the polarization scrambler of the central node 102 has a frequency of the state of polarization variation, which is used to enable the frequency lock loop unit in each end node 104A to 104N. In an implementation, the frequency lock loop unit of each end node 104A to 104N detects an average power of the beating frequency by integrating the power over a time period determined by a loop bandwidth, such as the bandwidth of the frequency lock loop unit. Therefore, the state of polarization (SOP) variation enabled by the polarization scrambler from the central node 102 is faster than the loop bandwidth, such as the bandwidth of the frequency lock loop unit. Moreover, the frequency lock loop unit is advantageously able to detect the beating frequency signal power in all cases and avoid the issue of polarization orthogonality between the two reference signals (or optical input signals). An alternative to polarization scrambler is to apply polarization diversity detection in the frequency lock loop unit, which requires two polarization splitters and two photo-diodes. Therefore, the method 200 address the wavelength (or frequency) control issue with great accuracy, flexibility, low-cost potential. Moreover, the method 200 has compatibility with existing power-split optical distribution networks (ODN), tolerant to uplink reflection, and has high power sensitivity. The method 200 is easy to implement as compared to conventional systems because the method 200 relies only on the frequency lock loop unit in each end node 104A to 104N, which can be easily integrated with the end node transceivers 114A to 114N at the chip level. In addition, the method 200 could become standard-relevant for the passive optical network (PON) systems by using non-TDM multiplexing architecture. The method 200 is particularly suitable for low-cost point to multi-point systems based on self-coherent receivers, such as the central node transceiver 112.

Figure 3A:
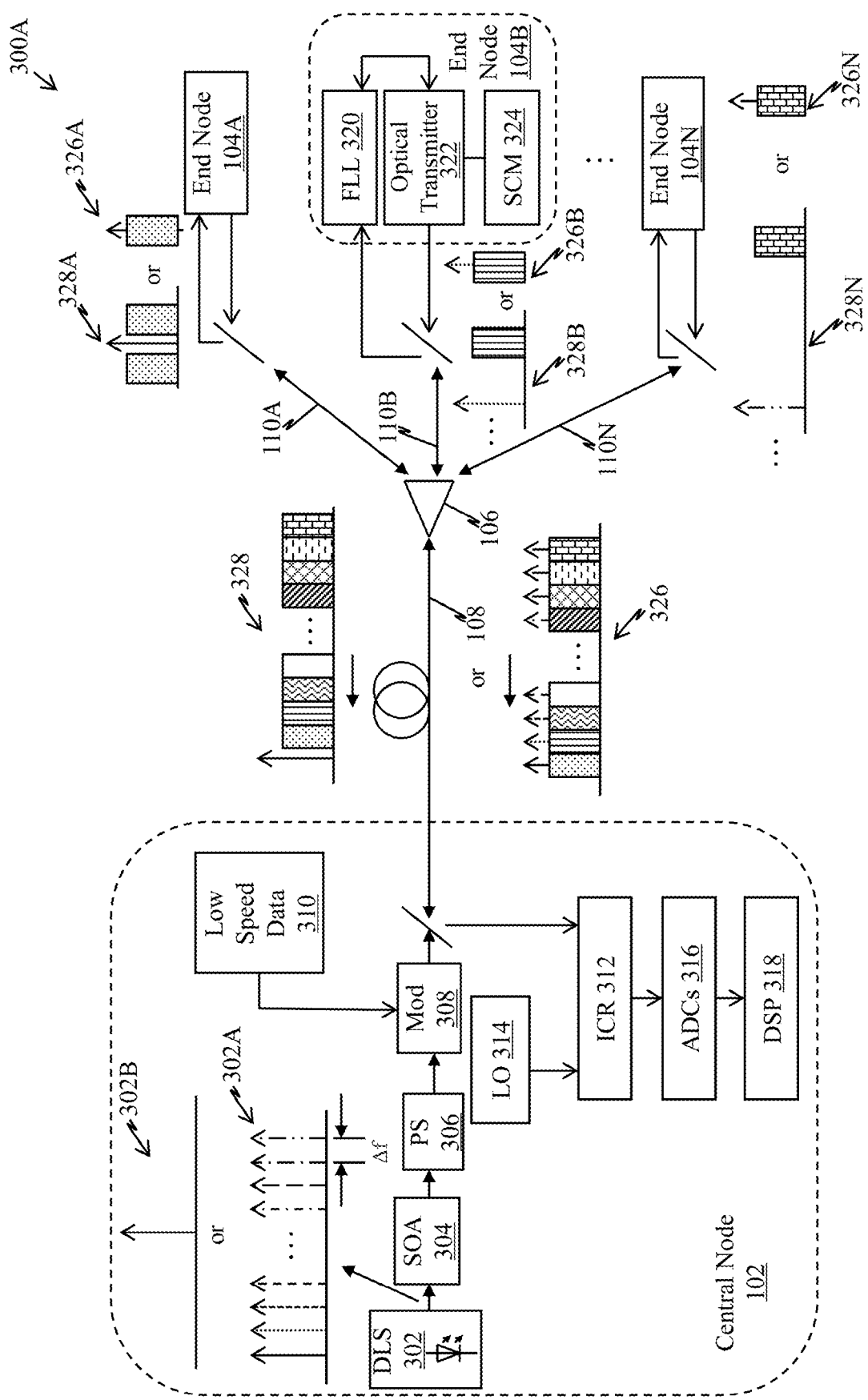
FIG. 3A is a block diagram of a system for wavelength control in a passive optical network (PON) with point to multi-point (P2MP) topology, in accordance with an embodiment of the present disclosure.

FIG. 3A is a block diagram of a system for wavelength control in a passive optical network (PON) with point to multi-point (P2MP) topology, in accordance with an embodiment of the present disclosure. FIG. 3A is described in conjunction with elements from FIG. 1A. With reference to FIG. 3A there is shown a system 300A that comprises the central node 102, the end nodes 104A to 104N, the remote node 106, the central node optical link 108, and the end node optical links 110A to 110N. The central node 102 further includes a downlink laser source 302, a semiconductor amplifier (SOA) 304, a polarization scrambler 306, a modulator 308, a low-speed data 310, an integrated coherent receiver 312, a local oscillator 314, an analog to digital converter 316, and a digital signal processing unit 318. Similarly, each end node 104A to 104N includes the end node 104B that includes a frequency locked loop unit 320, an optical transmitter 322, and a subcarrier modulator 324. There is further shown an a frequency comb 302A, and a single reference frequency 302B, a first signal spectrum 326, and a second signal spectrum 328. The first signal spectrum 326 further includes a plurality of signal spectrums 326A to 326N, and the second signal spectrum 328 further includes a plurality of signal spectrums 328A to 328N.

The downlink laser source 302 is also referred to as an optical frequency comb generator (OFCG). The downlink laser source 302 include suitable logic, circuitry, interfaces and/or code that is configured to generate a reference signal with the single reference frequency 302B (i.e., central node reference tone) or the frequency comb 302A (i.e., central node reference tone), which includes a plurality of reference tones. Examples of the downlink laser source 302 include but are not limited to a continuous wave laser, continuous wave comb frequency laser, a continuous wave laser array, and the like.

The semiconductor amplifier (SOA) 304 include suitable logic, circuitry, interfaces and/or code that is configured to amplify the reference signal. The semiconductor amplifier (SOA) 304 may also be referred to as an optical amplifier.

The polarization scrambler 306 includes suitable logic, circuitry, interfaces and/or code that is configured to vary a state of polarization (SOP) of the reference signal. The polarization scrambler 306 may also be referred to as a polarization controller. The modulator 308 include suitable logic, circuitry, interfaces and/or code that is configured to modulate the reference signal by the low-speed data 310.

The low-speed data 310 is also referred to as management information. The low-speed data 310 is used to indicate a target frequency assigned to each end node 104A to 104N.

The integrated coherent receiver 312 includes a suitable logic, circuitry, interfaces and/or code that is configured to transmit information in the form of an optical signal using the optical links, such as the central node optical link 108 and the end node optical links 110A to 110N. The integrated coherent receiver 312 is also configured to receive information in the form of an optical signal through optical links. The integrated coherent receiver 312 may also be referred to as a central node transceiver (or central node transceiver 112 of FIG. 1A). Examples of the integrated coherent receiver 312 include, but are not limited to, a transceiver, an optical transceiver, or a fiber optic transceiver.

The local oscillator 314 includes suitable logic, circuitry, interfaces and/or code that is configured to change the frequency of a signal, such as a reference signal. The local oscillator 314 is used with the integrated coherent receiver 312. The analog to digital converter 316 includes a suitable logic, circuitry, interfaces and/or code that is configured to convert the analog signal into digital form.

The digital signal processing unit 318 includes a suitable logic, circuitry, interfaces and/or code that is configured to measure, filter (or compress) the signal received from the analog to digital converter 316.

The frequency locked loop unit 320 includes a suitable logic, circuitry, interfaces and/or code that is configured to receive a signal that is locked to the frequency of an input signal, such as the reference signal. The optical transmitter 322 includes a suitable logic, circuitry, interfaces and/or code that is configured to generate laser signal, such as an uplink laser signal. The optical transmitter 322 provides a simple electrical circuit configuration for operation. In an example, the optical transmitter 322 works on the basis of direct modulation or using external modulation (e.g., using an external modulator, such as electro-absorption modulator (EAM) or Mach-Zehnder modulator (MZM), and optical transmitter 322 generally use distributed feedback structure with a diffraction grating in the waveguide for stable operation.

The subcarrier modulator 324 includes a suitable logic, circuitry, interfaces and/or code that is configured to apply subcarrier modulation on an optical signal for further transmissions, such as to the uplink laser signal as generated by the optical transmitter 322.

The first signal spectrum 326 and the second signal spectrum 328 corresponds to an uplink user data, which is assigned to each end node 104A to 104N. The first signal spectrum 326 further includes signal spectrum 326A to 326N, and the second signal spectrum 328 further includes signal spectrum 328A to 328N. The first signal spectrum 326 and the second signal spectrum 328 are assigned to each end node 104A to 104N based on the output of the downlink laser source 302.

In an example, the downlink laser source 302 of the central node 102 is a continuous wave laser and is configured to generate the reference signal with the frequency comb 302A. In an example, the reference signal received from the downlink laser source 302 is passed through the semiconductor optical amplifier 304 to process and amplify the reference signal (e.g., using antireflective processing). Thereafter, the reference signal is passed through the polarization scrambler 306, where the state of polarization (SOP) of the reference signal is varied by the polarization scrambler 306 of the central node 102. Therefore, the polarization scrambler 306 is used to mitigate polarization related impairments of the reference signal. The reference signal is further modulated by the low-speed data 310 of the management information (e.g., a modulating signal), where modulation is performed using the modulator 308 of the central node 102.

Therefore, the central node 102 is capable of generating the reference signal with different frequencies (tones), which carry the low-speed data 310 of the management information. Moreover, the integrated, coherent receiver 312 (or the central node transceiver 112) of the central node 102 broadcasts the reference signal along with the low-speed data 310 to each end node 104A to 104N. Thereafter, the reference signal is received by each end node 104A to 104N. In other words, in the single reference frequency case, a continuous wave laser whose output is first amplified via the semiconductor optical amplifier 304 and passed through the polarization scrambler 306. Thereafter, the single reference frequency is modulated by the low-speed data 310 (e.g., 1 kilobit/s) via an external modulator, such as the modulator 308. Further, the single reference frequency is transmitted to each end node 104A to 104N and fed into the frequency lock loop module in each end node 104A to 104N, such as the frequency lock loop 320 unit in end node 104B. The single reference frequency (or a downlink signal) is split in each end node 104A to 104N, and a small portion is detected by a single photodiode (not shown), and the low-speed data 310 is recovered. Moreover, the end node transmitter (e.g., the end node transceiver 114B of FIG. 1A) locks to a frequency with a pre-determined space as indicated from the low-speed data 310 (or the management data) relative to the down reference frequency. Then each end node 104A to 104N, such as the end node 104B, sends its data over the optical carrier via optical transmitter 322 or an external modulator (not shown). In an example, if the pre-determined space is zero for all end nodes 104A to 104N, meaning all end nodes 104A to 104N lock to an identical frequency, then subcarrier modulation (SCM) is applied by using the subcarrier modulator 324, and each end node 104A to 104N upshifts its signal to an uniquely assigned radio frequency band, such as a target frequency band and all uplink data is de-multiplexed in the central node receiver, such as the integrated coherent receiver 312 through the digital signal processor (DSP) unit 318. Therefore, the integrated coherent receiver 312 (or the central node transceiver 112) of the central node 102 realizes the frequency allocation and alignment in the passive optical network (PON) over the point to multi-point (P2MP) topology (or communication network).

However, if the downlink laser source 302 of the central node 102 is a continuous wave comb frequency laser (or a continuous wave laser array), then the downlink laser source 302 is configured to generate the reference signal, with the single reference frequency 302B, such that a frequency comb comprises a plurality of reference tones. However, the difference compared to the single reference frequency case exists in two aspects. First, the central node 102 office transceiver, such as the integrated coherent receiver 312, incorporates a continuous wave comb frequency laser (or a CW laser array), and all the continuous wave carriers are modulated by the same low-speed management data, such as the low-speed data 310. Second, each end node transceiver 114A to 114N locks to a uniquely assigned reference tone, and the radio frequency modulating signal can be a baseband signal or a subcarrier modulation signal via upshifting the baseband signal to a band very close to the optical carrier.

Figure 3B:
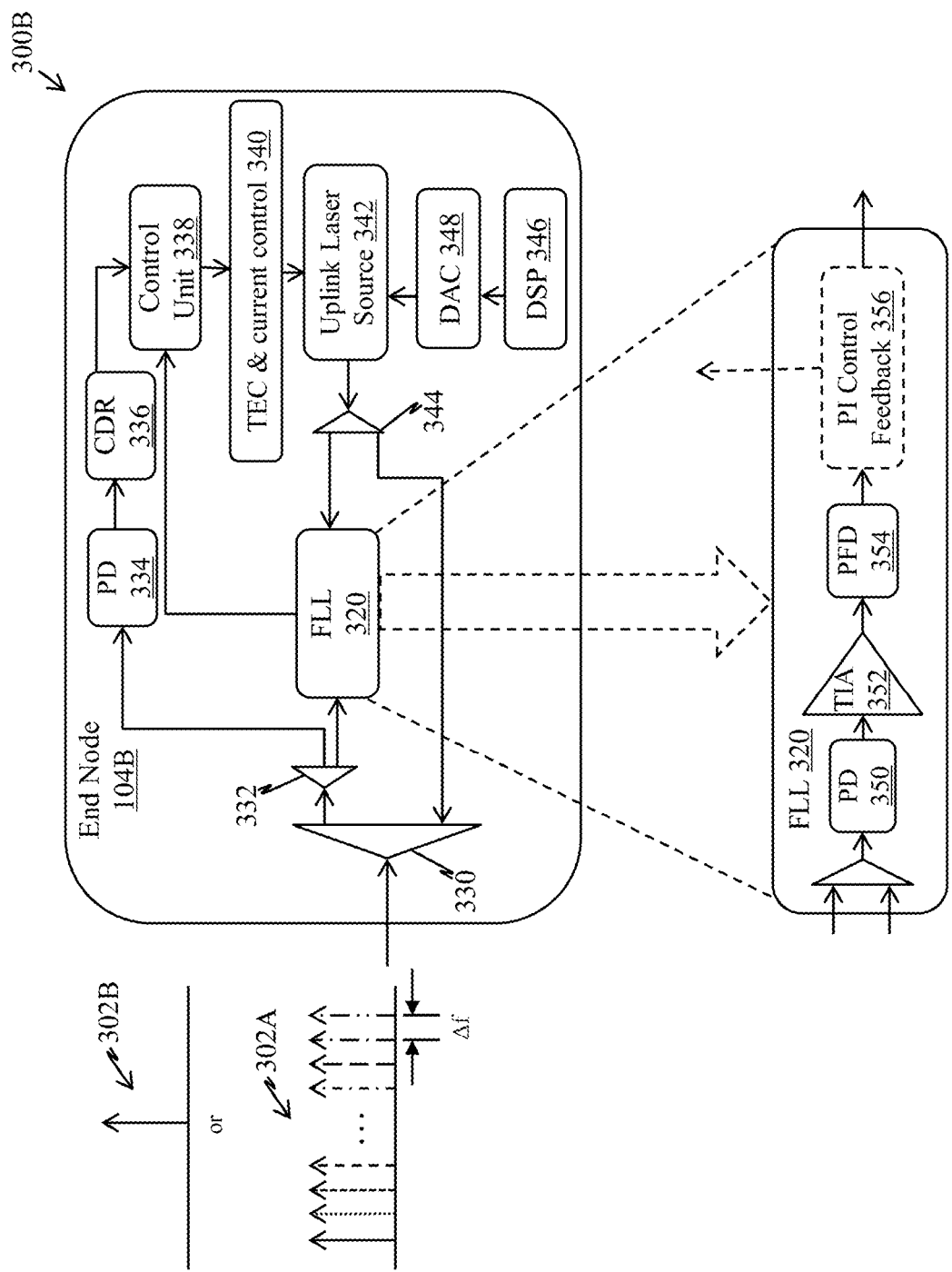
FIG. 3B is a block diagram of an end node with a frequency locked loop unit, in accordance with an embodiment of the present disclosure.

FIG. 3B is a block diagram of an end node with a frequency locked loop unit, in accordance with an embodiment of the present disclosure. FIG. 3B is described in conjunction with elements from FIGS. 1A and 3A. With reference to FIG. 3B there is shown the end node 104B that comprises the frequency locked loop unit 320, a logic circuit 330, a first splitter 332, a first photodiode 334, a clock and data recovery unit 336, a control unit 338, a thermoelectrical cooler and current control unit 340, uplink laser source 342, a second splitter 344, a digital signal processing (DSP) unit 346, a digital to analog converter 348. The frequency locked loop unit 320 further includes a second photodiode 350, a transimpedance amplifier 352, a phase frequency detector 354, and a proportion and integration control unit 356.

The logic circuit 330 includes a suitable logic, circuitry, interfaces and/or code that is configured to detect a reference signal received from the central node 102. Each of the first splitter 332 and the second splitter 344 is also referred to as optical splitter (e.g., passive optical splitter), which includes a suitable logic, circuitry, interfaces and/or code that is configured to split, or separate, an incident optical signal, such as the reference signal in two parts.

The first photodiode 334 and the second photodiode 350 may also referred to as semiconductor photodiodes, which are configured to convert an optical signal into an electrical signal. The clock and data recovery unit 336 includes a suitable logic, circuitry, interfaces and/or code that is configured to extract timing information from the optical signals, such as the low-speed data 310.

The control unit (or control device) 338 includes a suitable logic, circuitry, interfaces and/or code that is configured to process low-speed data 310, and to extract the target frequency of corresponding end node transceiver 114B, and also to generate the uplink laser tuning direction indications. The thermoelectrical cooler and current control unit (or control device) 340 includes a suitable logic, circuitry, interfaces and/or code that is configured to control the wavelength of an optical signal.

The uplink laser source 342 is configured to generate an optical signal, such as an uplink laser signal. The digital signal processing unit 346 includes a suitable logic, circuitry, interfaces and/or code that is configured to generate an uplink user data to modulate an optical signal, such as the uplink laser signal directly or externally.

The digital to analog converter 348 includes a suitable logic, circuitry, interfaces and/or code that is configured to convert a digital signal into analog form, such as to convert uplink user data into analog form. The transimpedance amplifier 352 is an inverting amplifier with negative feedback, which is used to convert an input current signal, such as the output of the second photodiode 350, into a voltage signal.

The phase frequency detector 354 includes a suitable logic, circuitry, interfaces and/or code that is configured to detect a voltage signal. The phase frequency detector 354 may also be referred to as a phase comparator.

The proportion and integration control unit (or control device) 356 includes a suitable logic, circuitry, interfaces and/or code that is configured to apply few corrections to the voltage signal based on the wavelength of the second photodiode 350.

The reference signal and the management information (or the downlink signals) as broadcasted by the central node transceiver 112 are received by the first splitter 332 for splitting the reference signal into two parts, such as a first part and a second part (e.g., with a ratio of 1:9). Moreover, the photodiode of each end node transceiver 114A to 114N, such as the photodiode 334 of the end node transceiver 114B, is configured to extract the management information from the first part of the reference signal. In other words, a small portion of the reference signal is detected by the photodiode of the end node transceiver 114B so as to recover the broadcast management information. The output of the photodiode is further processed through the clock and data recovery unit 336 of the end node transceiver 114B so as to extract timing information from the data of the management information. Thereafter, a control unit (or control device) of each of the end node transceivers 114A to 114N, such as the control unit 338 is used to process the management information, and also to extract the target frequency of corresponding end node transceiver 114B, and also to generate the uplink laser tuning direction indications. In an example, the control unit 338 of the end node transceiver 114B manages the uplink laser tuning direction indications to enable the laser control uplink of the uplink laser source 342 for a frequency scan to identify the target (or reference) frequency. Moreover, the uplink laser source 342 of end node transceiver 114B is used to generate the uplink laser signal for further communication with the central node transceiver 112 of the central node 102. For example, the uplink laser source 342 of the end node transceiver 114B is used by the end node 104B so as to generate the uplink laser signal for further communication with the central node transceiver 112 of the central node 102. In an example, the uplink laser source (or reference frequency laser) can also be integrated with the central node transceiver 112 of the central node 102 so as to reduce the overall cost. Optionally, the uplink laser source 342 is coupled to the frequency lock loop (FLL) unit 320 through the second splitter 344, and the frequency lock loop unit 320 is further coupled to the control unit 338.

In an example, the second part of the reference signal is detected by the photodiode 350 of the frequency lock loop unit 320, and the bandwidth of the photodiode 350 depends on a targeted beating frequency of the frequency lock loop unit 320. The output of the photodiode 350 is fed to the transimpedance amplifier 352 for further amplification. Thereafter, the phase frequency detector 354 is used to detect the voltage signal and generate the beating frequency, which is further processed through the proportion and integration control feedback block, such as the integration control unit 356. Moreover, the consequent beating frequency indicates that the wavelength of the end node 104B is getting closer to (or further apart from) the reference tone, which is critical feedback from the proportion and integration control feedback block, such as the integration control unit 356 to the control unit 338 so as to force the laser wavelength to move to the right direction. Therefore, the frequency lock loop unit 320 of the node transceiver 114B has a high power sensitivity, low cost. Further, the frequency lock loop unit can support a high split ratio with an accurate uplink wavelength control, and in certain scenarios the frequency lock loop unit can be based on a low bandwidth component.

In an implementation, the control unit 338 of each end node transceiver 114A to 114N, such as the end node transceiver 114B, is coupled to the thermoelectrical cooler (TEC) and the current control unit 340 of the corresponding end node transceiver 114B. The thermoelectrical cooler (TEC) and the current control unit 340 is configured to control the wavelength of the uplink laser signal of the uplink laser source 342 based on the signal received from the control unit 338, such as the uplink laser tuning direction indications received from the control unit 338 of the end node transceiver 114B. In other words, the output of the control unit 338 is passed to the thermoelectrical cooler (TEC) and the current control unit 340 so as to control the wavelength of the uplink laser signal based on the uplink laser tuning direction indications. Alternatively, thermoelectrical cooler and the current control unit 340 are used to do coarse and fine adjustments of the uplink laser signal (or laser frequency) generated by the uplink laser source 342 of the end node transceiver 114B, respectively, with high accuracy as compared to the conventional approach. In an example, the uplink laser source 342 is also coupled to the digital signal processing (DSP) unit 346 of the end node transceiver 114B so as to modulate the uplink laser signal of the uplink laser source 342. The uplink laser signal is modulated either directly or externally by the uplink user data, which is generated by the digital signal processing unit 346 of the end node transceiver 114B. Optionally, the uplink user data generated by the digital signal processing unit 346 is initially passed through a digital to analog converter 348, and then the uplink user data is used in analog form to modulate the uplink laser signal. Therefore, the modulated uplink laser signal is further used by the end node transceiver 114B for transmission of a modulated light over a shared optical fiber infrastructure with an accurate uplink wavelength control.

In an implementation, there are two options to modulate the uplink laser signal externally. One option is to directly feed a part of the uplink laser source 342 output to the frequency lock loop unit 320, and other part of the uplink laser source 342 is fed to an external modulator, as shown and further described in FIG. 3C. Another option is to feed a part of external modulator output to the frequency lock loop unit 320, where the external modulator is added before the second splitter 344 (or power splitter) and the output of the digital to analog converter 348 is applied to the external modulator, as shown and further described in FIG. 3D.

Figure 3C:
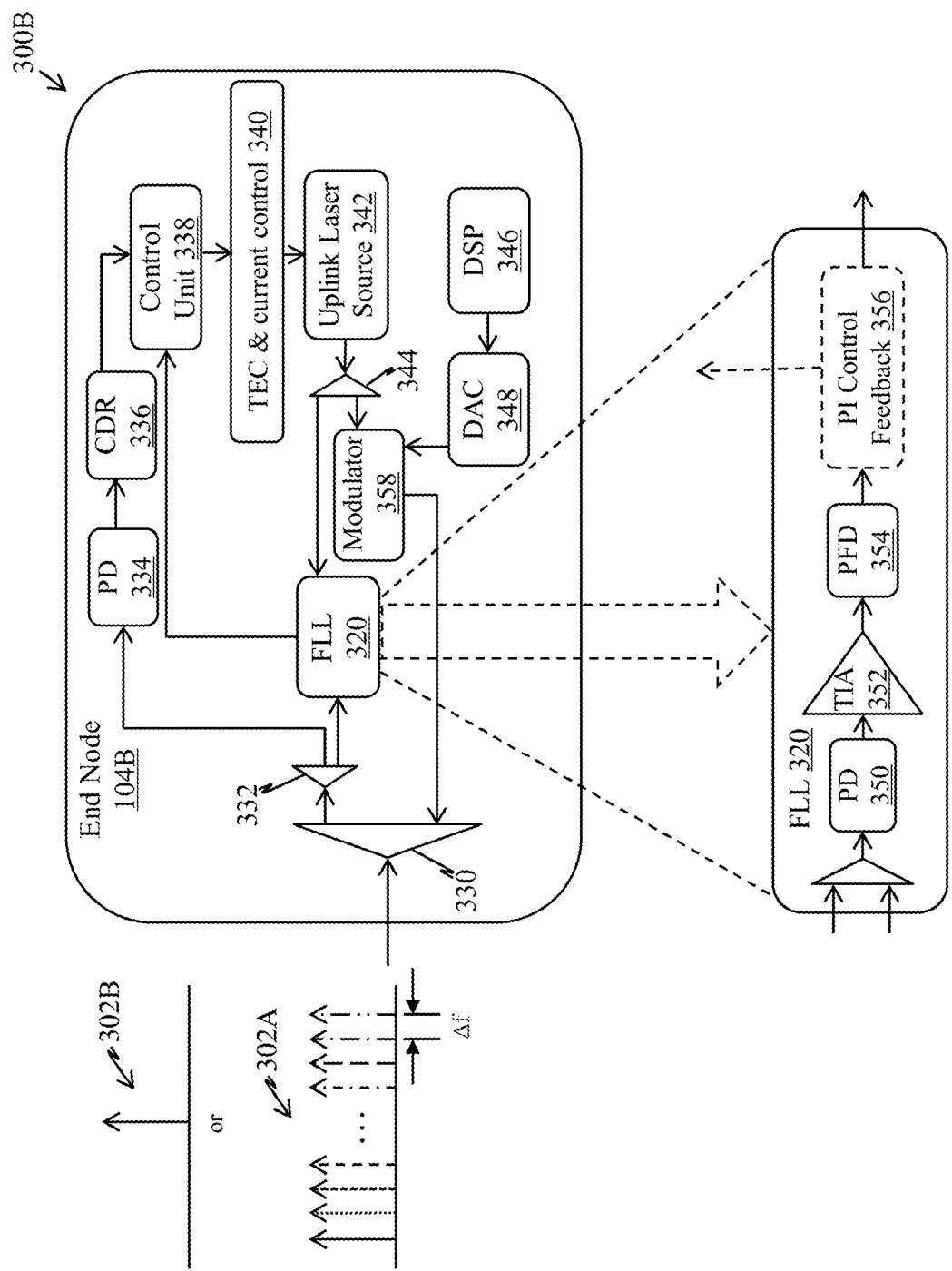
FIG. 3C is a block diagram of an end node with a frequency locked loop unit, in accordance with another embodiment of the present disclosure.

FIG. 3C is a block diagram of an end node with a frequency locked loop unit, in accordance with another embodiment of the present disclosure. FIG. 3C is described in conjunction with elements from FIGS. 1A, 3A and 3B. With reference to FIG. 3C there is shown the end node 104B that comprises the frequency locked loop unit 320, and an external modulator, such as a modulator 358.

In this implementation, a part of the uplink laser signal of the uplink laser source 342 is directly fed to the frequency lock loop unit 320, and other part of the uplink laser signal is modulated externally by the modulator 358. Thus, the uplink laser signal is modulated externally using the uplink user data, which is generated by the digital signal processing unit 346 of the end node transceiver 114B. Optionally, the uplink user data generated by the digital signal processing unit 346 is initially passed through the digital to analog converter 348, and then the uplink user data is used in analog form by the modulator 358 to modulate the uplink laser signal. Therefore, an externally modulated uplink laser signal is further used by the end node transceiver 114B for transmission of a modulated light over a shared optical fiber infrastructure with an accurate uplink wavelength control.

Figure 3D:
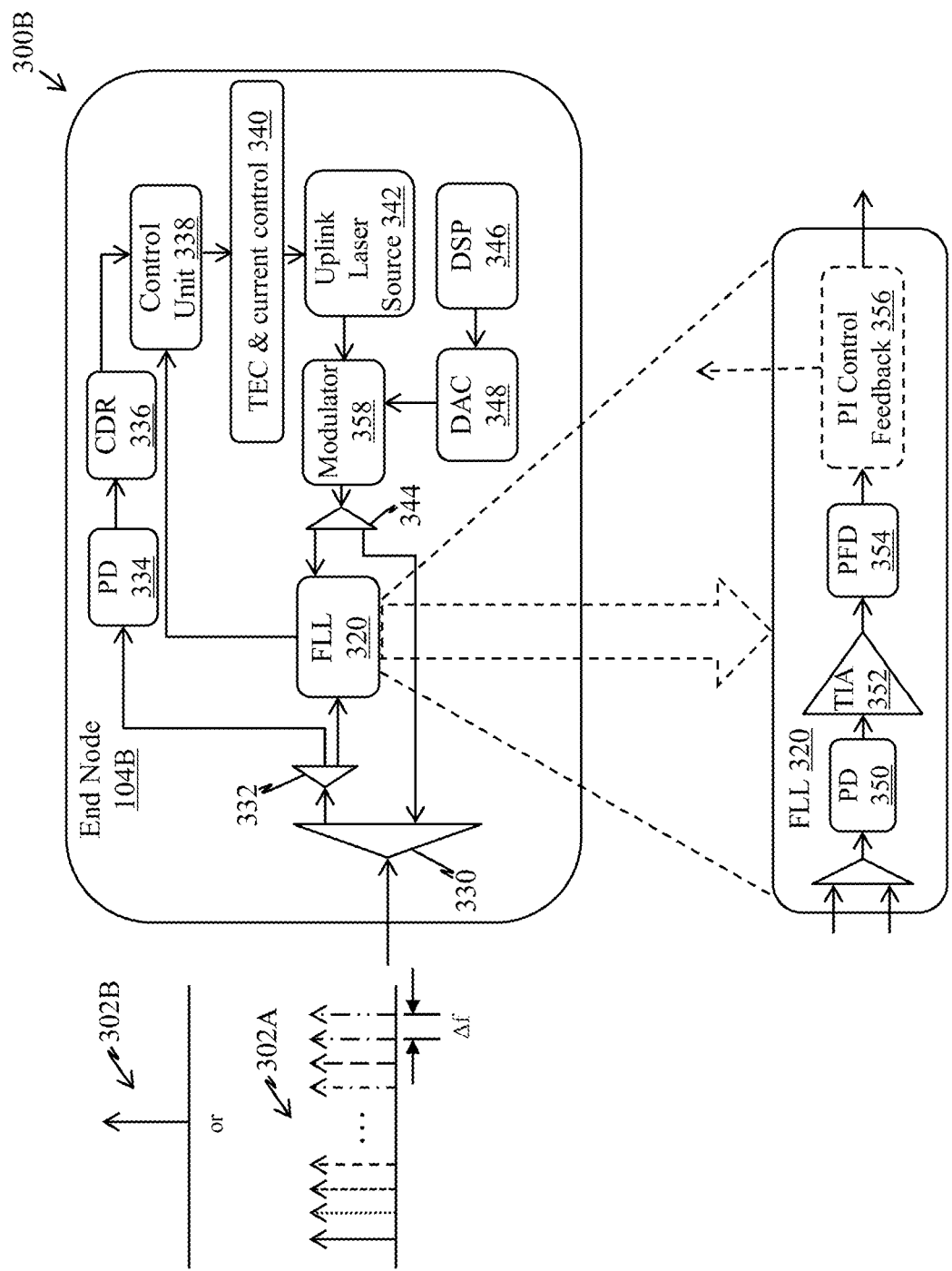
FIG. 3D is a block diagram of an end node with a frequency locked loop unit, in accordance with yet another embodiment of the present disclosure.

FIG. 3D is a block diagram of an end node with a frequency locked loop unit, in accordance with yet another embodiment of the present disclosure. FIG. 3D is described in conjunction with elements from FIGS. 1A, 3A, 3B and 3C. With reference to FIG. 3D there is shown the end node 104B that comprises the frequency locked loop unit 320, and the modulator 358.

In this implementation that uses an external modulator (i.e. the modulator 358), the uplink laser signal of the uplink laser source 342 is directly fed to the modulator 358 so as to modulate the uplink laser signal. The uplink laser signal is modulated using an uplink user data, which is generated by the digital signal processing unit 346 of the end node transceiver 114B. Optionally, the uplink user data generated by the digital signal processing unit 346 is initially passed through the digital to analog converter 348, and then the uplink user data is used in analog form by the modulator 358 to modulate the uplink laser signal. Thereafter, a part of the modulated uplink laser signal is fed to the frequency lock loop unit 320, and other part is fed to the logic circuit 330. Therefore, an externally modulated uplink laser signal is further used by the end node transceiver 114B for transmission of a modulated light over a shared optical fiber infrastructure with an accurate uplink wavelength control.

FIG. 4 is an illustration that depicts various frequency scheduling and data modulation schemes, in accordance with an embodiment of the present disclosure. FIG. 4 is described in conjunction with elements from FIGS. 1A, 3A, and 3A. With reference to FIG. 4 there is shown a tabular representation 400 that depicts various frequency scheduling between a central node reference tone 402 and an uplink signal spectrum 404. There is further shown an end node frequency locking and data modulation 406. The central node reference tone 402 represents the frequency comb 302A and the single reference frequency 302B. The uplink signal spectrum 404 represents a plurality of signal spectrum, such as the first signal spectrum 326, the second signal spectrum 328, a third signal spectrum 410, a fourth signal spectrum 416, and a fifth signal spectrum 420. The end node frequency locking and data modulation 406 represents a plurality of data modulation schemes, such as a first data modulation scheme 408, a second data modulation scheme 412, a third data modulation scheme 414, a fourth data modulation scheme 418, and a fifth data modulation scheme 422.

The central node reference tone 402 and the uplink signal spectrum 404 are used to represent various frequency scheduling based on the downlink laser source 302 of the central node transceiver 112 of the central node 102. Similarly, the end node frequency locking and data modulation 406 is used to represents a different type of data modulation schemes required based on the downlink laser source 302.

In an example, the downlink laser source 302 is a continuous wave comb frequency laser (or a continuous wave laser array), and the reference signal is generated with the frequency comb 302A, which further comprises a plurality of reference tones. Therefore, each of the end node transceivers 114A to 114N of each end node 104A to 104N are locked to the same reference tone of the frequency comb, and subcarrier modulation is required to modulate the uplink laser signal, as shown by the first signal spectrum 326, and the first data modulation scheme 408. Moreover, a low bandwidth is required for each end node transceiver 114A to 114N, and for the frequency lock loop unit 320. However, if the number of the reference tones of the frequency comb 302A is less than a number of the end nodes 104A to 104N, then a shared frequency topology is used, where the end nodes 104A to 104N are divided into different groups, and where members of the same group share the same target frequency, as shown by the third signal spectrum 410. Moreover, each end node transceiver 114A to 114N is configured for applying a subcarrier modulation (SCM) or code-division multiplexing, (CDM) to the uplink laser signal transmitted in the target frequency band assigned to several end nodes 104A to 104N, as shown by the second data modulation schemes 412. Therefore, several end nodes 104A to 104N lock to the same reference tone. However, in such a case, a low bandwidth is required for the end node transceivers 114A to 114N, and a moderate bandwidth is required for the frequency lock loop unit 320.

In another example, the downlink laser source 302 is a continuous wave laser, and the reference signal is generated with the single reference frequency 302B. Therefore, in such a case, each end node transceiver 114A to 114N of each end node 104A to 104N are locked to a unique target frequency band, which is at a pre-determined distance (or space) relative to the single reference frequency, and indicated by the management information. In an example, if the pre-determined distance is zero, then all the end node transceivers 114A to 114N lock to the same reference tone, and subcarrier modulation is required to modulate the uplink laser signal, as shown by the second signal spectrum 328, and the third data modulation schemes 414. Moreover, a high bandwidth may be required for each end node transceiver 114A to 114N, and a low bandwidth may be required for the frequency lock loop unit 320. Further, the frequency lock loop unit 320 can have a low bandwidth-based component. If the pre-determined distance is not equal to zero, then the target frequency can be assigned either using shared frequency topology or without using shared frequency topology. In shared frequency topology, each end node 104A to 104N, are divided into different groups, and members of the same group share the same target frequency band. Therefore, few of the end node transceivers 114A to 114N are locked to the target frequency band on a pre-determined distance to the single reference frequency for each end node transceiver 114A to 114N, as shown by the fourth signal spectrum 416, and the fourth data modulation schemes 418. In other words, several end nodes 104A to 104N lock to the same reference tone. Moreover, subcarrier modulation (or the code-division multiplexing) is applied to the uplink laser signal transmitted in the target frequency band assigned to several end nodes 104A to 104N. Further, in such a case, a moderate bandwidth is required for the end node transceivers 114A to 114N as well as for the frequency lock loop unit 320. However, if the target frequency is assigned using non-shared frequency topology, then each end node transceiver 114A to 114N are locked to the target frequency band on a pre-determined distance to the single reference frequency for each end node transceiver 114A to 114N, as shown by the fifth signal spectrum 420, and the fifth data modulation schemes 422. Moreover, in such a case, subcarrier modulation is applied to the uplink laser signal transmitted in the target frequency band assigned to several end nodes 104A to 104N. Further, in such a case, a low bandwidth is required for the end node transceivers 114A to 114N, and a high bandwidth is required for the frequency lock loop unit 320.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A system for wavelength control in a passive optical network (PON) with a point to multi-point (P2MP) topology comprising a central node and a plurality of end nodes, the system comprising:
    a central node transceiver configured to broadcast to the plurality of end nodes a reference signal carrying a management information, wherein the management information indicates a target frequency assigned to each end node of the plurality of end nodes; and
    an end node transceiver in each end node of the plurality of end nodes, configured to:
        determine, for the particular end node, the particular target frequency by extracting the management information from the reference signal,
        generate, for the particular end node, a particular beating frequency by beating the reference signal with an uplink laser signal, and
        control, for the particular end node, a wavelength of the uplink laser signal to lock to the particular target frequency based on the beating frequency.

2. The system of claim 1, wherein the central node transceiver comprises:
    a downlink laser source for generating the reference signal;
    a polarization scrambler (PS) for varying a state of polarization (SOP) of the reference signal; and
    a modulator for modulating the reference signal by a data of the management information.

3. The system of claim 2, wherein the data of the management information is low-speed data.

4. The system of claim 2, wherein the downlink laser source is configured to generate the reference signal with a single reference frequency, and wherein the management information indicates the particular target frequency assigned to each end node by indicating a particular target frequency band on a particular pre-determined distance to the single reference frequency for the particular end node.

5. The system of claim 2, wherein the downlink laser source is configured to generate the reference signal with a frequency comb comprising a plurality of reference tones, and wherein the management information indicates the particular target frequency assigned to each end node by indicating a particular reference tone of the plurality of reference tones of the frequency comb assigned to the particular end node.

6. The system of claim 5, wherein a number of the reference tones of the frequency comb is less than a number of the end nodes, and wherein the management information indicates the particular reference tone of the frequency comb assigned to each end node and a particular target frequency band on a particular pre-determined distance to the particular reference tone for the particular end node.

7. The system of claim 6, wherein each end node transceiver is configured to apply a subcarrier modulation (SCM) or a code-division multiplexing (CDM) to the uplink laser signal transmitted in the particular target frequency band assigned to the particular end node, and wherein the particular target frequency band is assigned to several end nodes of the plurality of end nodes.

8. The system of claim 5, wherein a number of the reference tones of the frequency comb is equal or larger than a number of the end nodes, and wherein each end node transceiver is configured to apply a baseband modulation or a subcarrier modulation (SCM) to the uplink laser signal transmitted at the particular target frequency.

9. The system of claim 1, wherein each end node transceiver is further configured to split the reference signal into two parts, wherein the management information is extracted from a first part of the reference signal, and wherein the beating frequency is generated by beating a second part of the reference signal with the uplink laser signal.

10. The system of claim 1, wherein each end node transceiver comprises:
a photodiode (PD) for extracting the management information;
a control device (CU) configured to determine the particular target frequency and generate uplink laser tuning direction indications;
an uplink laser source for generating the uplink laser signal;
a frequency lock loop (FLL) device for generating the beating frequency;
a thermoelectrical cooler (TEC);
a current control device configured to control the wavelength of the uplink laser signal based on the uplink laser tuning direction indications; and
a digital signal processing (DSP) device configured to generate an uplink user data to modulate the uplink laser signal directly or externally.

11. The system of claim 9, wherein each end node transceiver further comprises:
a splitter for splitting the reference signal into two parts;
a photodiode (PD) for extracting the management information;
a control device (CU) configured to determine the particular target frequency and generate uplink laser tuning direction indications;
an uplink laser source for generating the uplink laser signal;
a frequency lock loop (FLL) device for generating the beating frequency;
a thermoelectrical cooler (TEC);
a current control device configured to control the wavelength of the uplink laser signal based on the uplink laser tuning direction indications; and
a digital signal processing (DSP) device configured to generate an uplink user data to modulate the uplink laser signal directly or externally.

12. The system of claim 2, wherein the PS has a frequency of the SOP variation enabling a frequency lock loop (FLL) device in the particular end node to stably lock to the particular target frequency.

13. The system of claim 12, wherein the FLL device comprises a photodiode (PD), a transimpedance amplifier, (TIA), a phase frequency detector (PFD), and a proportion and integration (PI) control feedback block.

14. A method of wavelength control in a passive optical network (PON) with a point to multi-point (P2MP) topology comprising a central node and a plurality of end nodes, the method comprising:
broadcasting, from the central node to the plurality of end nodes, a reference signal carrying a management information, wherein the management information indicates a target frequency assigned to each end node of the plurality of end nodes;
determining, by each end node of the plurality of end nodes, the particular target frequency for the particular end node by extracting the management information from the reference signal;
generating, by the particular end node, a particular beating frequency by beating the reference signal with an uplink laser signal; and
controlling, by the particular end node, a wavelength of the uplink laser signal to lock to the particular target frequency based on the particular beating frequency.

15. The method of claim 14, wherein the broadcasting, from the central node to the plurality of end nodes, the reference signal comprises:
generating the reference signal by a downlink laser source (302);
varying a state of polarization (SOP) of the reference signal by a polarization scrambler (PS); and
modulating the reference signal by a data of the management information by a modulator.

16. The method of claim 15, wherein the modulating the reference signal comprises modulating the reference signal by low-speed data.

17. The method of claim 15, wherein the generating the reference signal comprises generating the reference signal with a single reference frequency, and wherein the management information indicates the particular target frequency assigned to the particular end node by indicating a particular target frequency band on a particular pre-determined distance to the single reference frequency for the particular end node.

18. The method of claim 15, wherein the generating the reference signal comprises generating the reference signal with a frequency comb comprising a plurality of reference tones, and wherein the management information indicates the particular target frequency assigned to the particular end node by indicating a particular reference tone of the frequency comb assigned to the particular end node.

19. The method of claim 18, wherein a number of the reference tones of the frequency comb is less than a number of the end nodes, and wherein the management information indicates the particular reference tone of the frequency comb assigned to the particular end node and a particular target frequency band on a particular pre-determined distance to the particular reference tone for the particular end node.

20. The method of claim 19, further comprising:
applying a subcarrier modulation (SCM) or a code-division multiplexing (CDM) in a particular end node transceiver in the particular end node to the uplink laser signal transmitted in the particular target frequency band assigned to the particular end node, wherein the particular target frequency band is assigned to several end nodes of the plurality of end nodes.

21. The method of claim 18, wherein a number of the reference tones of the frequency comb is equal or larger than a number of the end nodes, and wherein the method further comprises applying a baseband modulation or a subcarrier modulation (SCM) in a particular end node transceiver in the particular end node to the uplink laser signal transmitted at the particular target frequency.

22. The method of claim 14, further comprising:
splitting the reference signal into two parts in a particular end node transceiver in the particular end node,
wherein the management information is extracted from a first part of the reference signal, and the particular beating frequency is generated by beating a second part of the reference signal with the uplink laser signal.

23. The method of claim 15, wherein the generating, by the particular end node, the beating frequency comprises applying a frequency lock loop (FLL).

24. The method of claim 23, wherein the varying of the SOP of the reference signal in the central node has a frequency enabling the FLL in the particular end node to stably lock to the particular target frequency.

\* \* \* \* \*